US012297657B2

(12) United States Patent
Hatanaka et al.

(10) Patent No.: US 12,297,657 B2
(45) Date of Patent: May 13, 2025

(54) STEEL DAMPER FOR SEISMIC ISOLATION AND SEISMIC ISOLATION STRUCTURE

(71) Applicants: OSAKA UNIVERSITY, Suita (JP); JFE CIVIL ENGINEERING & CONSTRUCTION CORPORATION, Tokyo (JP); JFE STEEL CORPORATION, Tokyo (JP)

(72) Inventors: Yuki Hatanaka, Osaka (JP); Susumu Kuwahara, Osaka (JP); Ryota Tobari, Tokyo (JP); Mitsutoshi Yoshinaga, Tokyo (JP); Kazuaki Miyagawa, Tokyo (JP); Hiromitsu Morioka, Tokyo (JP); Tomohiro Kinoshita, Tokyo (JP)

(73) Assignees: OSAKA UNIVERSITY, Suita (JP); JFE CIVIL ENGINEERING & CONSTRUCTION CORPORATION, Tokyo (JP); JFE STEEL CORPORATION, Tokyo (JP)

( * ) Notice: Subject to any disclaimer, the term of this patent is extended or adjusted under 35 U.S.C. 154(b) by 167 days.

(21) Appl. No.: 17/791,616

(22) PCT Filed: Oct. 18, 2021

(86) PCT No.: PCT/JP2021/038444
§ 371 (c)(1),
(2) Date: Jul. 8, 2022

(87) PCT Pub. No.: WO2022/113567
PCT Pub. Date: Jun. 2, 2022

(65) Prior Publication Data
US 2023/0036876 A1  Feb. 2, 2023

(30) Foreign Application Priority Data
Nov. 27, 2020 (JP) .................................. 2020-197379

(51) Int. Cl.
*E04H 9/00* (2006.01)
*E04H 9/02* (2006.01)
*F16F 15/02* (2006.01)

(52) U.S. Cl.
CPC .............. *E04H 9/021* (2013.01); *E04H 9/027* (2013.01); *E04H 9/00* (2013.01); *E04H 9/0215* (2020.05); *F16F 15/02* (2013.01)

(58) Field of Classification Search
None
See application file for complete search history.

(56) References Cited

U.S. PATENT DOCUMENTS 3,066,905 A * 12/1962 Gertel ..................... F16F 15/06
188/380
3,398,998 A * 8/1968 Burnett ................... F16C 11/06
384/2

(Continued)

FOREIGN PATENT DOCUMENTS

JP  2003-206987 A  7/2003
JP  2004-278205 A  10/2004

(Continued)

OTHER PUBLICATIONS

Jun. 23, 2022 Office Action issued in Taiwanese Patent Application No. 110143888.

(Continued)

*Primary Examiner* — Phi D Tran
(74) *Attorney, Agent, or Firm* — Oliff PLC

(57) ABSTRACT

An upper board fixed to a lower part of a structure; a lower board fixed to a foundation at the same position in a plan view with respect to the upper board; and four seismic isolation plates fixed to the upper and lower boards and extending in a cross direction in a plan view. The seismic isolation plates are U-shaped members obtained by bending a long steel sheet, and include an upper fixing part parallel (Continued)

to a lower fixing part, an upper inclined part and a lower inclined part that are closer to each other while separated from the upper and lower fixing parts, and a connecting part that connects the upper and lower inclined parts. The four seismic isolation plates are fixed to upper board at position where upper fixing parts do not overlap and are fixed to lower board at position where lower fixing parts do not overlap.

14 Claims, 19 Drawing Sheets

(56) References Cited

U.S. PATENT DOCUMENTS

| | | | | |
|---|---|---|---|---|
| 3,625,466 | A * | 12/1971 | Marshall | F16F 15/02 188/380 |
| 4,099,696 | A * | 7/1978 | Toome | B63B 49/00 74/5.5 |
| 5,358,210 | A * | 10/1994 | Simon | F16F 3/12 248/630 |
| 5,374,012 | A * | 12/1994 | Marchand | B64D 47/08 248/608 |
| 5,382,008 | A * | 1/1995 | Tyutinman | F16F 7/08 248/584 |
| 5,509,238 | A * | 4/1996 | Scalfati | E04H 9/021 52/167.7 |
| 6,254,070 | B1 * | 7/2001 | Runge | F16F 1/428 267/152 |
| 6,695,296 | B1 * | 2/2004 | Runge | F16F 1/377 267/153 |
| 7,303,184 | B1 * | 12/2007 | Bower | F16F 3/023 267/136 |
| 9,255,399 | B2 * | 2/2016 | Ruan | E04H 12/22 |
| 10,174,467 | B1 * | 1/2019 | Li | E01D 19/042 |
| 10,808,794 | B1 * | 10/2020 | Boyce | F16F 15/02 |
| 2012/0304587 | A1 * | 12/2012 | Kenho | F16F 15/06 52/699 |
| 2022/0010575 | A1 * | 1/2022 | Cui | E04H 9/024 |
| 2023/0036876 | A1 * | 2/2023 | Hatanaka | F16F 15/06 |
| 2023/0104946 | A1 * | 4/2023 | Towfighi | E04H 9/023 52/167.1 |
| 2023/0212831 | A1 * | 7/2023 | Mualla | F16F 15/022 14/22 |
| 2023/0258222 | A1 * | 8/2023 | Chaundhry | F16F 15/06 248/618 |
| 2024/0019014 | A1 * | 1/2024 | Nagata | F16F 15/06 |
| 2024/0056019 | A1 * | 2/2024 | Park | F16F 15/02 |

FOREIGN PATENT DOCUMENTS

| | | | | |
|---|---|---|---|---|
| JP | 2004-340301 | A | | 12/2004 |
| JP | 2015-6836 | A | | 1/2015 |
| JP | 2017-061808 | A | | 3/2017 |
| JP | 2020-041691 | A | | 3/2020 |
| KR | 101223531 | B1 * | 11/2013 | |
| KR | 101362926 | B1 * | 2/2014 | |
| KR | 101362930 | B1 * | 7/2014 | |
| WO | WO-2009054532 | A1 * | 4/2009 | E04H 9/021 |

OTHER PUBLICATIONS

Dec. 14, 2021 International Search Report issued in International Patent Application No. PCT/JP2021/038444.

Jun. 8, 2023 Notification of Transmittal and May 30, 2023, International Preliminary Report on Patentability issued in International Application No. PCT/JP2021/038444.

* cited by examiner

STEEL DAMPER FOR SEISMIC ISOLATION AND SEISMIC ISOLATION STRUCTURE

TECHNICAL FIELD

The present invention relates to a steel damper for seismic isolation and a seismic isolation structure that are installed between a lower part of a structure and a foundation and absorb energy due to external force such as seismic motion.

BACKGROUND ART

For building structures such as skyscrapers and large civil engineering structures, a seismic isolation structure is installed between the lower part of the structure and the foundation to improve safety against large-scale seismic motion.

The seismic isolation structure includes a seismic isolation device and a seismic isolation damper, and when a large-scale seismic motion occurs, the seismic isolation device moves in a horizontal direction while supporting a vertical load of the structure, and the seismic isolation damper absorbs the energy of seismic motion to prevent the energy of seismic motion from being directly transmitted to the structure.

As a seismic isolation damper, a steel damper for seismic isolation including an upper board fixed to an upper structure provided at the lower part of the structure; a lower board fixed to a lower structure provided on a foundation; and four seismic isolation plates installed between the upper board and the lower board and arranged in a cross shape in a plan view is known (for example, refer to PTL 1).

The four seismic isolation plates of PTL 1 are members having the same shape formed by bending a long steel sheet, and include an upper fixing part and a lower fixing part configured to be formed parallel to each other; a pair of inclined parts configured to be closer to each other while being separated from the upper fixing part and the lower fixing part; and a connecting part configured to connect the pair of inclined parts to be at a position close to each other. The four seismic isolation plates are referred to as first to fourth seismic isolation plates.

Here, the pair of upper fixing parts and the pair of lower fixing parts of the first and second seismic isolation plates arranged in the same straight line in a plan view are arranged to face each other, the pair of upper fixing parts and the pair of lower fixing parts of the third and fourth seismic isolation plates arranged in directions orthogonal to the first and second seismic isolation plates in a plan view are arranged to face each other by providing an overlapping unit having a substantially rectangular shape in a plan view for the pair of upper fixing parts and the pair of lower fixing parts of the first and second seismic isolation plates, the overlapping unit of the upper fixing parts of the first to fourth seismic isolation plates is fixed to the upper board, the overlapping unit of the lower fixing parts of the first to fourth seismic isolation plates is fixed to the lower board, and accordingly, the first to fourth seismic isolation plates are arranged in a cross shape in a plan view between the upper board and the lower board.

CITATION LIST

Patent Literature

PTL 1: JP 2020-41691 A

SUMMARY OF INVENTION

Technical Problem

When a large-scale seismic motion occurs, a large relative displacement of approximately 400 mm to 600 mm occurs between the upper structure and the lower structure. Therefore, the four seismic isolation plates (first to fourth seismic isolation plates) that configure the steel damper for seismic isolation of PTL 1 are required to have the deformability to follow a large relative displacement.

Here, when the seismic isolation plate of PTL 1 is manufactured using a general steel sheet bending machine, it is difficult to manufacture a seismic isolation plate having a deformability of approximately 400 mm to 600 mm.

In other words, in the steel damper for seismic isolation of PTL 1, the overlapping unit of the upper fixing parts of the four seismic isolation plates is fixed to the upper board, and the overlapping unit of the lower fixing parts of the four seismic isolation plates is fixed to the lower board. Therefore, the dimension of the upper fixing part and the lower fixing part of the seismic isolation plate in the long direction needs to be at least approximately 300 mm. Further, in order to ensure the deformability to follow a large relative displacement, it is required to set the dimension of the inclined part of the seismic isolation plate in the longitudinal direction to approximately 400 mm to 600 mm.

In a general steel sheet bending machine, when the bending height of the steel sheet is approximately 500 mm, the bending depth is limited to 700 mm. When bending the seismic isolation plate using this general steel sheet bending machine, the sum of the dimension of the upper fixing part (or the lower fixing part) in the longitudinal direction and the dimension of the inclined part in the longitudinal direction is the bending depth of the general steel sheet bending machine. However, the dimension of the upper fixing part (or the lower fixing part) in the longitudinal direction is approximately 300 mm, and thus the dimension of the inclined part in the longitudinal direction is limited to approximately 400 mm (700-300) or less.

Therefore, when bending a seismic isolation plate using a general steel sheet bending machine, it is not possible to set the dimension of the inclined part in the longitudinal direction as long as approximately 400 mm to 600 mm, and thus it is difficult to manufacture a seismic isolation plate that absorbs energy when a large-scale seismic motion occurs.

Therefore, the present invention has been made in view of the above circumstances, and provides a steel damper for seismic isolation having the necessary deformability for the large relative displacement that occurs between the structure and the foundation when a large-scale seismic motion occurs, and capable of absorbing the energy of seismic motion. In addition, the present invention provides a seismic isolation structure capable of preventing the energy of seismic motion from being directly transmitted to the structure.

Solution to Problem

In order to achieve the above object, according to an aspect of the present invention, there is provided a steel damper for seismic isolation installed between a lower part of a structure and a foundation, including: an upper board fixed to the lower part of the structure; a lower board fixed to the foundation to be at the same position in a plan view with respect to the upper board; and four seismic isolation plates fixed to the upper board and the lower board and extending in a cross direction in a plan view, in which the four seismic isolation plates are members obtained by bending a long steel sheet, and include an upper fixing part and a lower fixing part parallel to each other, an upper inclined part and a lower inclined part that are closer to each other while being separated from the upper fixing part and the lower fixing part, and a connecting part that connects the upper inclined part and the lower inclined part to each other, and the four seismic isolation plates are fixed to the upper board at a position where the upper fixing parts do not overlap each other, and are fixed to the lower board at a position where the lower fixing parts do not overlap each other.

According to another aspect of the present invention, there is provided a seismic isolation structure including: the above-described steel damper for seismic isolation; and a seismic isolation device installed between a lower part of a structure and a foundation, and moving in a horizontal direction while supporting a vertical load of the structure when a seismic motion occurs.

Advantageous Effects of Invention

According to the present invention, the steel damper for seismic isolation has the necessary deformability for the large relative displacement that occurs between the structure and the foundation when a large-scale seismic motion occurs, and is capable of absorbing the energy of seismic motion.

In addition, according to the present invention, the seismic isolation structure is capable of preventing the energy of seismic motion from being directly transmitted to the structure.

DESCRIPTION OF EMBODIMENTS

Figure 1:
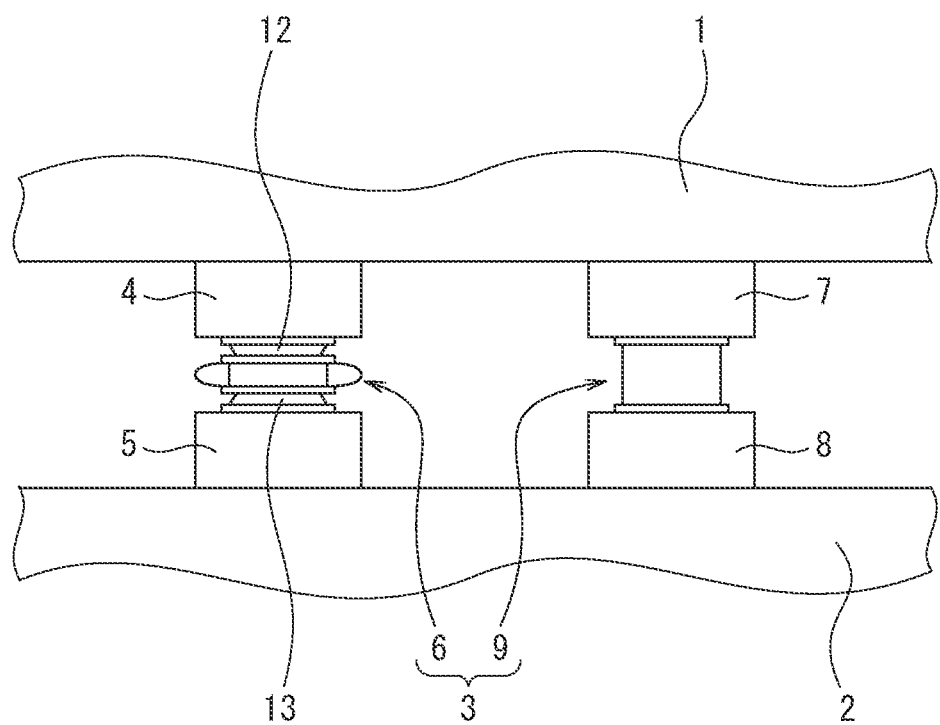
FIG. 1 is a view illustrating a seismic isolation structure according to the present invention.

Next, embodiments according to the present invention will be described with reference to the drawings. In the description of the following drawings, the same or similar parts will be given the same or similar reference numerals. However, the drawings are schematic, and the relationship between the thickness and the plane dimensions, the ratio of the thicknesses of each layer, and the like are supposed to be different from the actual ones. Therefore, the specific thickness or dimensions are supposed to be determined in consideration of the following description. In addition, it is needless to say that the drawings may include the parts having different dimensional relationships or ratios from each other.

In addition, the embodiments described below exemplify apparatuses and methods for embodying the technical idea of the present invention, and the technical idea of the present invention does not specify the material, shape, structure, arrangement, and the like of the configuration components in the following embodiments. The technical idea of the present invention may be modified in various manners within the technical scope specified by the claims described in the claims.

First Embodiment

FIG. 1 illustrates a seismic isolation structure 3 installed between a structure 1, such as a building structure (for example, a skyscraper) or a large civil engineering structure, and a foundation 2.

The seismic isolation structure 3 includes a steel damper for seismic isolation 6 of a first embodiment installed between a damper upper structure 4 provided at the lower part of the structure 1 and a damper lower structure 5 provided on the foundation 2; and a seismic isolation device 9 installed between a device upper structure 7 provided at the lower part of the structure 1 adjacent to the damper upper structure 4 and a device lower structure 8 provided on the foundation 2 adjacent to the damper lower structure 5. Although only one set of seismic isolation structures 3 is illustrated in FIG. 1, a plurality of sets is installed between the structure 1 and the foundation 2. The damper upper structure 4, the damper lower structure 5, the device upper structure 7, and the device lower structure 8 are made of reinforced concrete.

Figure 2:
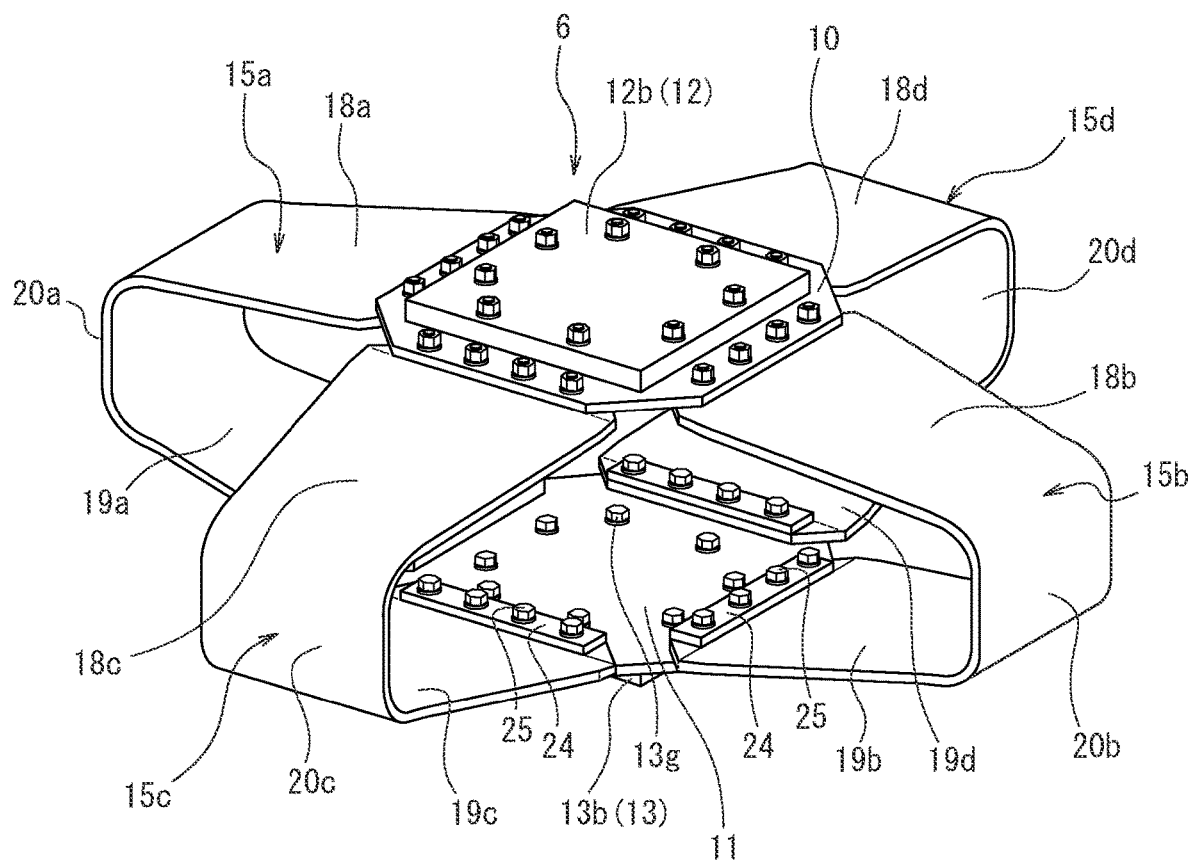
FIG. 2 is a perspective view illustrating a steel damper for seismic isolation according to a first embodiment of the present invention.

FIG. 2 illustrates the steel damper for seismic isolation 6 of the first embodiment, and the steel damper for seismic isolation 6 includes an upper board 10 fixed to the damper upper structure 4 via an upper jig 12 (refer to FIG. 1); a lower board 11 fixed to the damper lower structure 5 via a lower jig 13 (refer to FIG. 1) to be at the same position in the plan view with respect to the upper board 10; and four seismic isolation plates 15a, 15b, 15c, and 15d that are fixed to the upper board 10 and the lower board 11, and extend in a cross direction orthogonal to each other in a plan view.

Figure 3A:
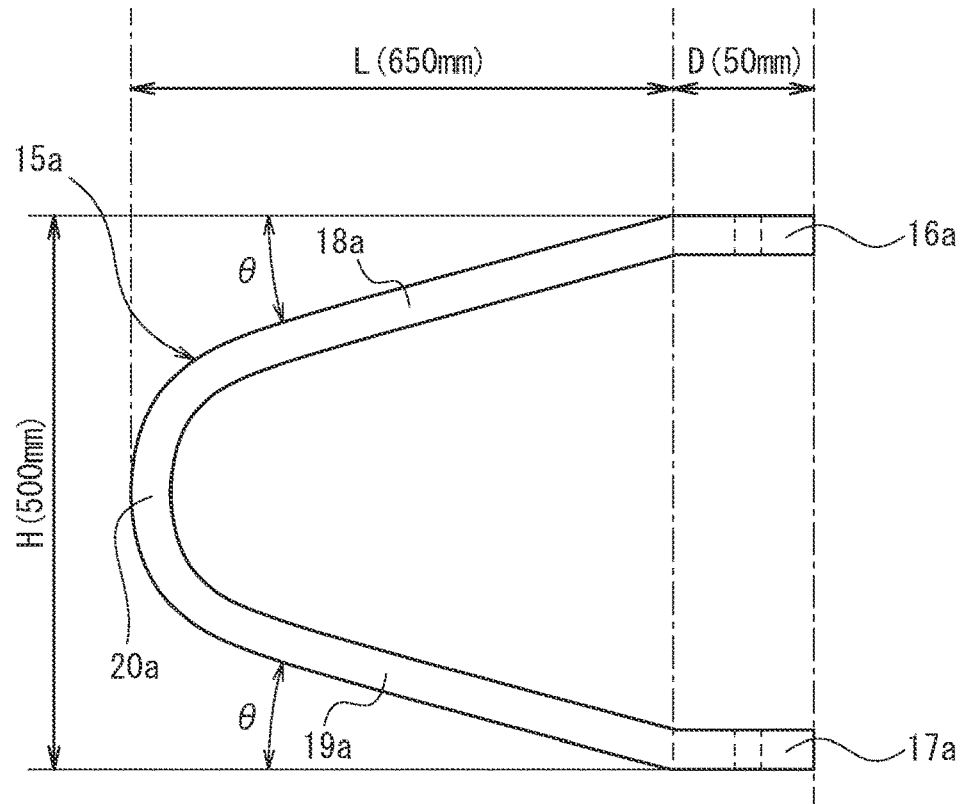
FIG. 3 is a view illustrating a seismic isolation plate formed by bending a steel sheet that configures a steel damper for seismic isolation according to the first embodiment of the present invention.

The seismic isolation plate 15a is a member formed by bending a long rectangular steel sheet, and as illustrated in FIG. 3A, the seismic isolation plate 15a includes a flat plate-shaped upper fixing part 16a fixed to the upper board 10; a flat plate-shaped lower fixing part 17a that extends parallel to the upper fixing part 16a with the same dimension in the longitudinal direction as the dimension of the upper fixing part 16a, and is fixed to the lower board 11; a flat plate-shaped upper inclined part 18a and a lower inclined part 19a extending at the same inclination angle θ to be closer to each other while being separated from the upper fixing part 16a and the lower fixing part 17a; and a connecting part 20a that connects the upper inclined part 18a and the lower inclined part 19a to each other.

Figure 3B:
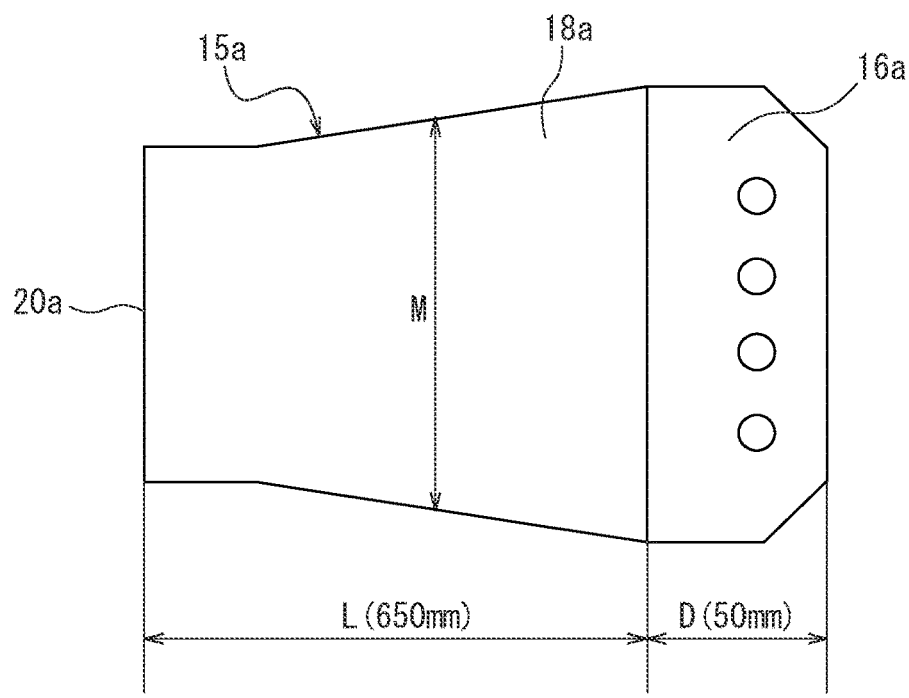

As illustrated in FIGS. 3A and 3B, a plurality of bolt through-holes is formed in the upper fixing part 16a. A plurality of bolt through-holes is also formed in the lower fixing part 17a. Then, as illustrated in FIG. 3B, the upper inclined part 18a of the seismic isolation plate 15a is formed such that a width dimension M gradually decreases from the upper fixing part 16a toward the connecting part 20a, and the lower inclined part 19a is formed such that the width dimension M also gradually decreases from the lower fixing part 17a toward the connecting part 20a.

Further, the other three seismic isolation plates 15b, 15c, and 15d are also members having the same shape as the shape of the above-described seismic isolation plate 15a, and the parts having the same configuration as the configuration of the parts that configure the seismic isolation plate 15a have the same reference numerals with subscripts "b, c, d" instead of "a".

Further, the other three seismic isolation plates 15b, 15c, and 15d are also members having the same shape as the shape of the above-described seismic isolation plate 15a, and the parts having the same configuration as the configuration of the parts that configure the seismic isolation plate 15a have the same reference numerals with subscripts "b, c, d" instead of "a".

Here, regarding the actual size of the seismic isolation plate 15a, as illustrated in FIG. 3A, a distance (bending height) H between the upper fixing part 16a and the lower fixing part 17a is 500 mm, a dimension D of the upper fixing part 16a (lower fixing part 17a) in the longitudinal direction is 50 mm, and a dimension L of the upper inclined part 18a (lower inclined part 19a) in the longitudinal direction is 650 mm. Further, the other three seismic isolation plates 15b, 15c, and 15d are also formed with the same dimension as the dimension of the seismic isolation plate 15a.

Figure 4:
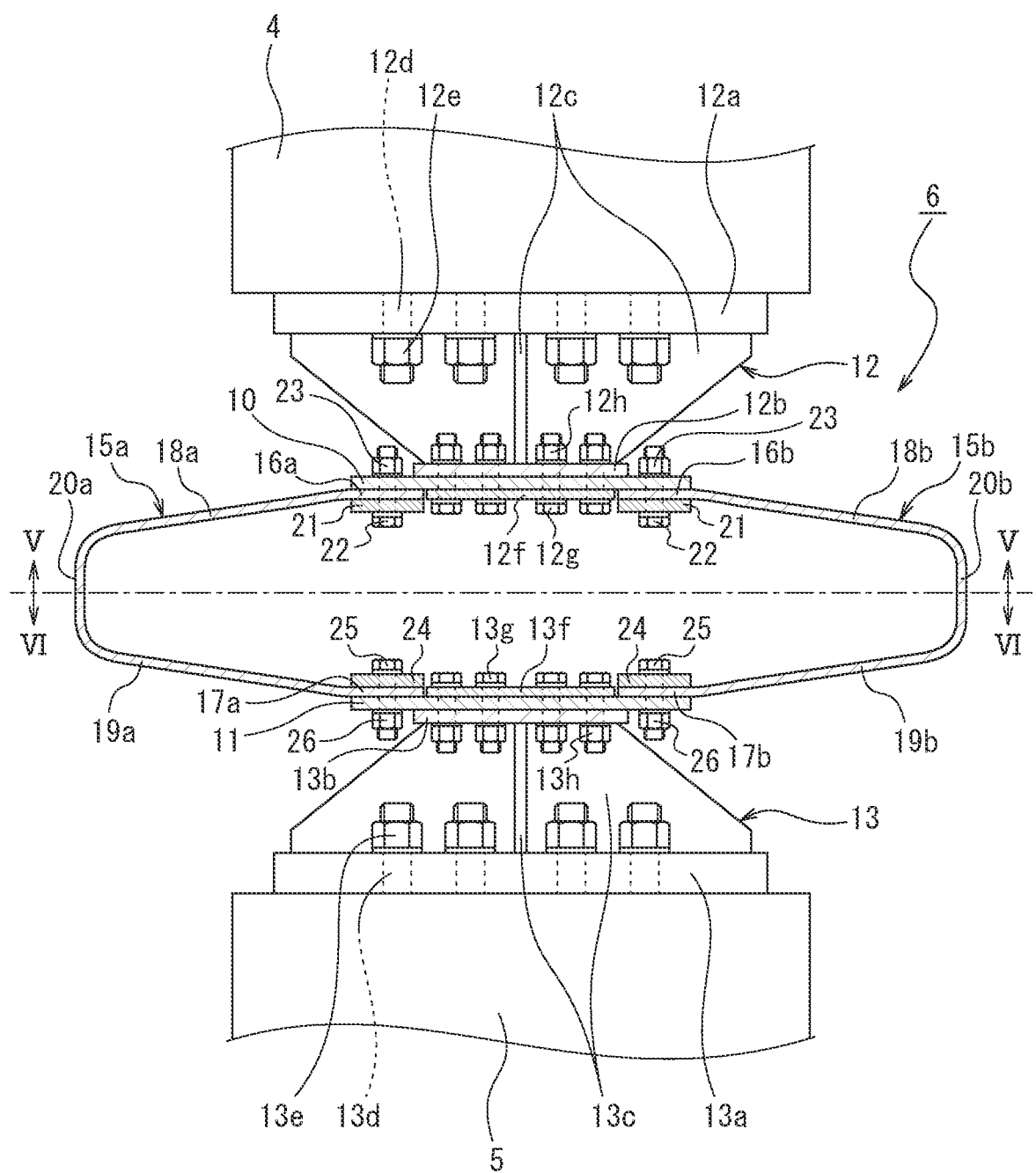
FIG. 4 is a vertical sectional view illustrating a main part of the steel damper for seismic isolation according to the first embodiment of the present invention.

As illustrated in FIG. 4, the upper jig 12 that fixes the upper board 10 to the damper upper structure 4 includes an anchor plate 12a that abuts on the lower surface of the damper upper structure 4; an upper board side plate 12b that abuts on the upper board 10; and a rib plate 12c fixed by welding orthogonally between the anchor plate 12a and the upper board side plate 12b. In addition, FIG. 4 illustrates only the seismic isolation plates 15a and 15b that face each other in a straight line in a plan view among the four seismic isolation plates 15a, 15b, 15c, and 15d.

A plurality of through-holes is formed on the anchor plate 12a, and by passing a plurality of anchor bolts 12d protruding from the lower surface of the damper upper structure 4 through the through-holes, protruding the anchor bolts 12d from the lower surface, and screwing the anchor bolts 12d with nuts 12e, the anchor plate 12a is bolted to the damper upper structure 4.

Figure 5:
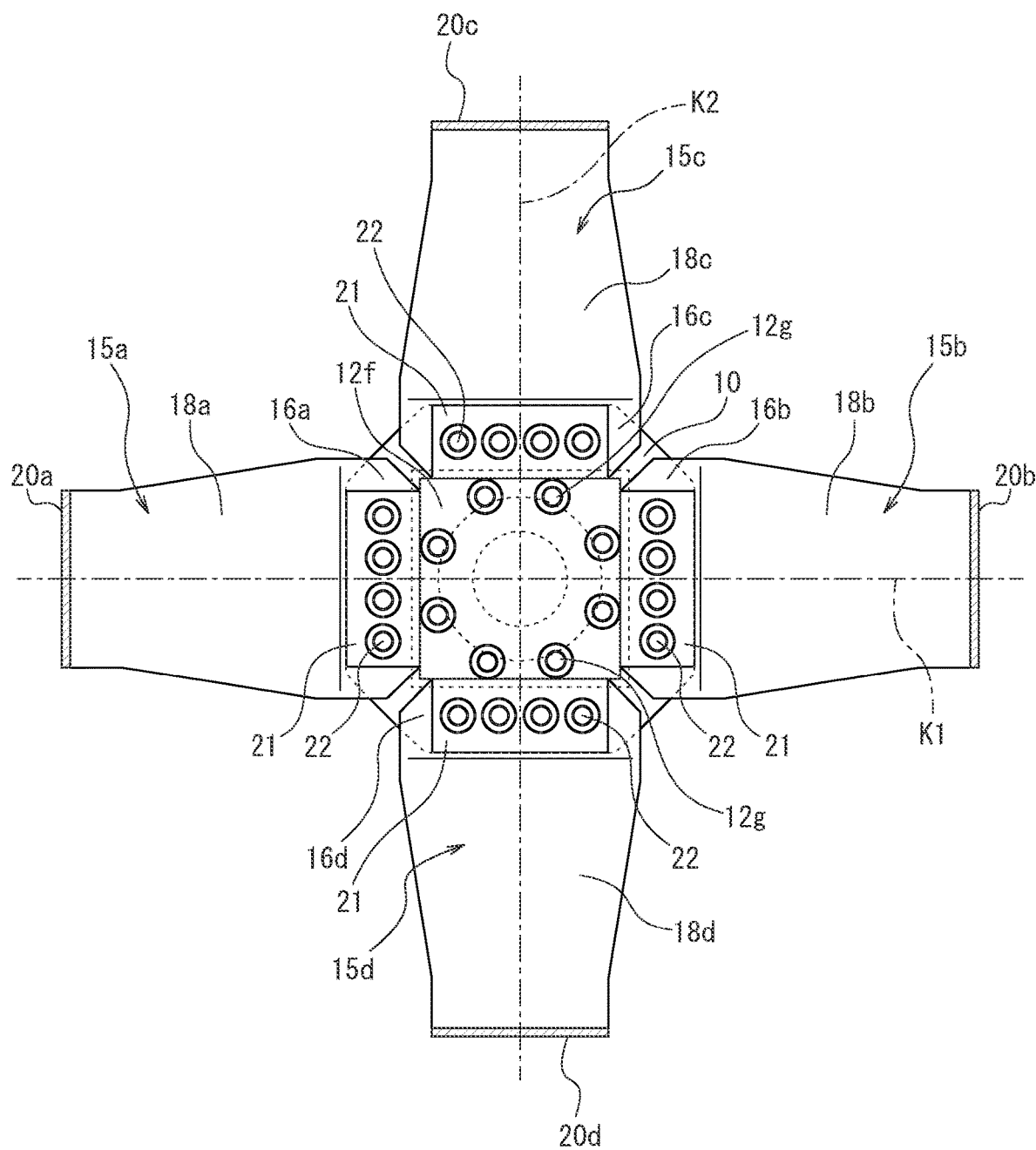
FIG. 5 is a view taken along the line V-V of FIG. 4.

The upper board side plate 12b is a rectangular plate having a smaller area than the area of the upper board 10, and has a part where the upper board side plate 12b abuts on the center of the upper surface of the upper board 10 and does not overlap the upper board side plate 12b on the entire circumference of the upper surface of the upper board 10. Further, a first splice plate 12f having substantially the same shape as the shape of the upper board side plate 12b abuts on the center of the lower surface of the upper board 10, and there is a part that does not overlap the first splice plate 12f on the entire circumference of the lower surface of the upper board 10. In addition, as illustrated in FIGS. 4 and 5, by inserting connecting bolts 12g into the plurality of through-holes formed at the part where the upper board side plate 12b, the upper board 10, and the first splice plate 12f overlap each other, and screwing the connecting bolts 12g with nuts 12h, the upper board 10 is bolted to the upper board side plate 12b.

As illustrated in FIG. 4, the lower jig 13 that fixes the lower board 11 to the damper lower structure 5 includes an anchor plate 13a that abuts on the upper surface of the damper lower structure 5; a lower board side plate 13b that abuts on the lower board 11; and a rib plate 13c fixed by welding orthogonally between the anchor plate 13a and the lower board side plate 13b.

In addition, by passing a plurality of anchor bolts 13d protruding from the upper surface of the damper lower structure 5 through the through-holes formed on the lower board side plate 13b, protruding the anchor bolts 13d from the upper surface, and screwing the anchor bolts 13d with nuts 13e, the anchor plate 13a is bolted to the damper lower structure 5.

In addition, the lower board side plate 13b is a rectangular plate having a smaller area than the area of the lower board 11, and has a part where the lower board side plate 13b abuts on the center of the upper surface of the lower board 11 and does not overlap the lower board side plate 13b on the entire circumference of the lower surface of the lower board 11. Further, a second splice plate 13f having substantially the same shape as the shape of the lower board side plate 13b abuts on the center of the upper surface of the lower board 11, and there is a part that does not overlap the second splice plate 13f on the entire circumference of the upper surface of the lower board 11. In addition, as illustrated in FIGS. 4 and 6, by inserting connecting bolts 13g into the plurality of through-holes formed at the part where the lower board side plate 13b, the lower board 11, and the second splice plate 13f overlap each other, and screwing the connecting bolts 13g with nuts 13h, the lower board 11 is bolted to the lower board side plate 13b.

Here, the vertical distance between the damper upper structure 4 and the damper lower structure 5 differ depending on the installation location of the steel damper for seismic isolation 6. Therefore, the plurality of types of upper jigs 12 having different heights of the rib plate 12c and the plurality of types of lower jigs 13 having different heights of the rib plate 13c are prepared, and by selecting and arranging the predetermined upper jig 12 and lower jig 13 corresponding to the vertical distance between the damper upper structure 4 and the damper lower structure 5, the steel damper for seismic isolation 6 is installed via the upper jig 12 and the lower jig 13 between the damper upper structure 4 and the damper lower structure 5.

Figure 6:
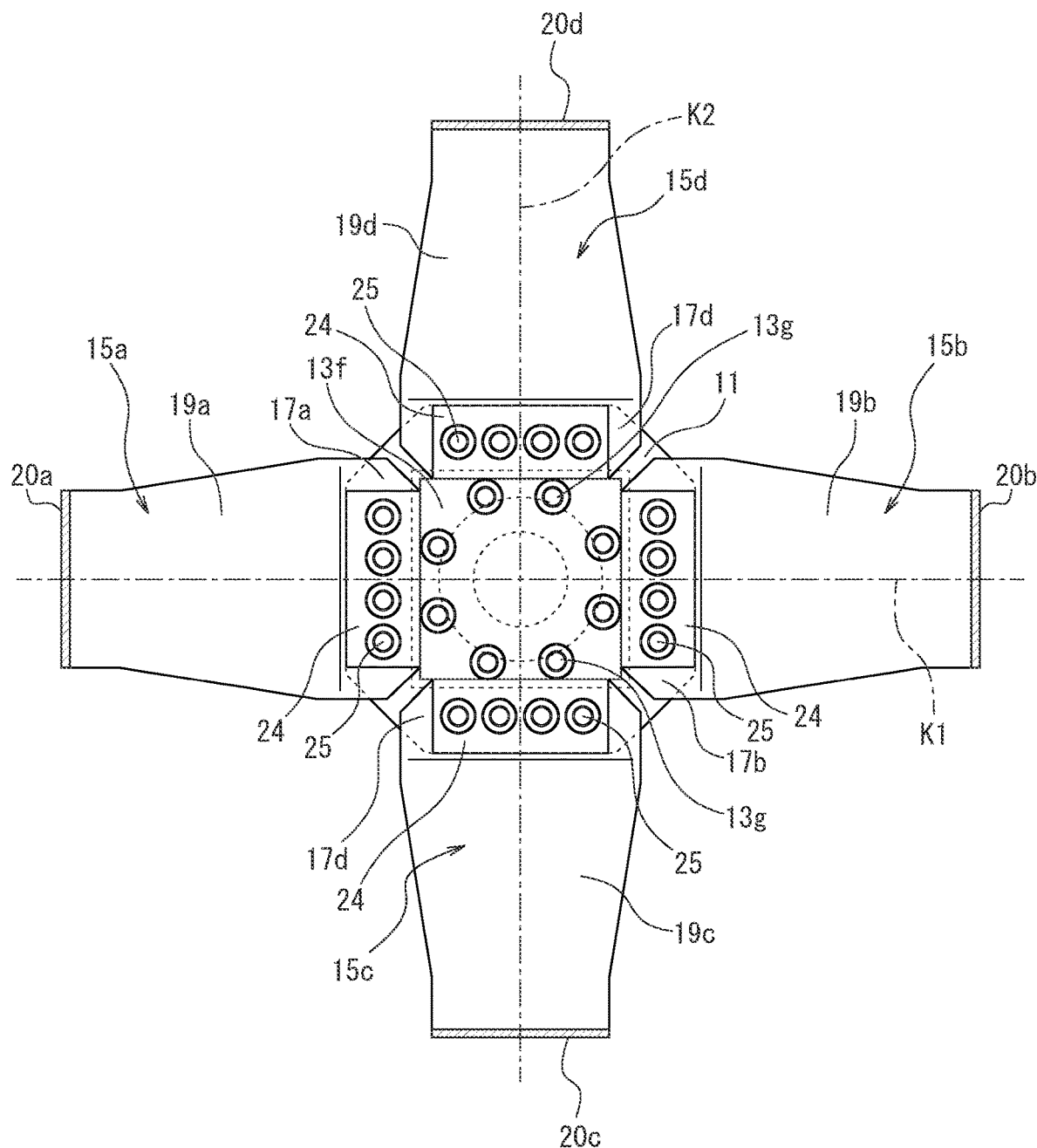
FIG. 6 is a view taken along the line VI-VI of FIG. 54.

As illustrated in FIGS. 5 and 6, on the two seismic isolation plates 15a and 15b, the upper inclined parts 18a and 18b and the lower inclined parts 19a and 19b are arranged to extend on a virtual straight line K1 extending in the horizontal direction, and on the other two seismic isolation plates 15c and 15d, the upper inclined parts 18c and 18d and the lower inclined parts 19c and 19d are arranged to extend on a virtual straight line K2 orthogonal to the virtual straight line K1 on the horizontal plane.

As illustrated in FIG. 5, the upper fixing parts 16a and 16b of the two seismic isolation plates 15a and 15b abut on the lower surface of the part that does not overlap the upper board side plate 12b and the first splice plate 12f of the upper board 10 on the virtual straight line K1, and the upper fixing parts 16c and 16d of the other two seismic isolation plates 15c and 15d also abut on the lower surface of the part that does not overlap the upper board side plate 12b and the second splice plate 13f of the upper board 10 on the virtual straight line K2. A rectangular third splice plate 21 abuts on the lower surfaces of each of the upper fixing parts 16a, 16b, 16c, and 16d, the connecting bolt 22 is inserted into the through-hole formed in these members, and the nut 23 is screwed with the connecting bolt 22. Accordingly, the upper fixing parts 16a, 16b, 16c, and 16d of the four seismic isolation plates 15a, 15b, 15c, and 15d do not overlap each other and are bolted in a state of being sandwiched between the upper board 10 and the third splice plate 21.

In addition, as illustrated in FIG. 6, the lower fixing parts 17a and 17b of the two seismic isolation plates 15a and 15b abut on the upper surface of the part that does not overlap the lower board side plate 13b and the second splice plate 13f of the lower board 11 on the virtual straight line K1, and the lower fixing parts 17c and 17d of the other two seismic isolation plates 15c and 15d also abut on the upper surface of the part that does not overlap the lower board side plate 13b and the second splice plate 13f of the lower board 11 on the virtual straight line K2. Further, a rectangular third splice plate 24 abuts on the upper surfaces of each of the lower fixing parts 17a, 17b, 17c, and 17d, the connecting bolt 25 is inserted into the through-hole formed in these members, and the nut 26 is screwed with the connecting bolt 25. Accordingly, the lower fixing parts 17a, 17b, 17c, and 17d of the four seismic isolation plates 15a, 15b, 15c, and 15d do not overlap each other and are bolted to the upper board 10.

Next, the actions and effects of the steel damper for seismic isolation 6 and the seismic isolation structure 3 of the first embodiment will be described.

In the seismic isolation structure 3 having the above-described configuration, when a seismic motion occurs, the seismic isolation device 9 moves in the horizontal direction while supporting the vertical load of the structure 1. Since the four seismic isolation plates 15a, 15b, 15c, and 15d of the steel damper for seismic isolation 6 are arranged in the cross direction in the plan view, no matter which direction the seismic motion acts in the horizontal plane, by performing deformation of the upper inclined parts 18a, 18b, 18c, and 18d, the connecting parts 20a, 20b, 20c, and 20d, and the lower inclined parts 19a, 19b, 19c, and 19d of each of the seismic isolation plates 15a, 15b, 15c, and 15d both in the shear direction and the bending direction, the energy of seismic motion is absorbed, and the energy of seismic motion can be prevented from being directly transmitted to the structure 1.

Further, the upper fixing parts 16a, 16b, 16c, and 16d of the seismic isolation plates 15a, 15b, 15c, and 15d are firmly tightened and fixed by the connecting bolts 22 and the nuts 23 in a state of being sandwiched between the upper board 10 and the four third splice plates 21 from the thickness direction, and the lower fixing parts 17a, 17b, 17c, and 17d of the seismic isolation plates 15a, 15b, 15c, and 15d are firmly tightened and fixed by the connecting bolts 25 and the nuts 26 in a state of being sandwiched between the lower board 11 and the four third splice plates 24 from the thickness direction. Accordingly, the plastic deformation of the upper fixing parts 16a, 16b, 16c, and 16d and the lower fixing parts 17a, 17b, 17c, and 17d when the energy of seismic motion is transmitted is prevented, and thus absorbency of energy of seismic motion of the steel damper for seismic isolation 6 can be prevented from decreasing.

Further, the width dimension M of the upper inclined part 18a of the seismic isolation plate 15a gradually decreases from the upper fixing part 16a toward the connecting part 20a, and the width dimension of the lower inclined part 19a also gradually decreases from the lower fixing part 17a toward the connecting part 20a. Therefore, even when the seismic isolation plate 15a is twisted, the energy of seismic motion can be efficiently absorbed. Further, since the other three seismic isolation plates 15b, 15c, and 15d have the same structure as the structure of the seismic isolation plate 15a, the energy of seismic motion due to the occurrence of twist can be efficiently absorbed.

Then, when a large-scale seismic motion occurs, a large relative displacement of approximately 400 mm to 600 mm occurs between the structure 1 and the foundation 2.

In the seismic isolation plates 15a, 15b, 15c, and 15d of the first embodiment, the dimension L (refer to FIG. 3A) of the upper inclined parts 18a, 18b, 18c, and 18d and the lower inclined parts 19a, 19b, 19c, and 19d in the longitudinal direction is set to 700 mm, and the deformability (700 mm) required for a large relative displacement (approximately 400 mm to 600 mm) between the structure 1 and the foundation 2 is provided, and thus the energy of seismic motion can be sufficiently absorbed.

Further, the seismic isolation plates 15a, 15b, 15c, and 15d of the first embodiment can be manufactured by using a general steel sheet bending machine. Here, the general steel sheet bending machine is a device of which the maximum bending depth is limited to approximately 850 mm when the bending height of the steel sheet is approximately 500 mm.

When the bending height H is set to 500 mm, the maximum bending depth when manufacturing the seismic isolation plates 15a, 15b, 15c, and 15d is a dimension (D+L) obtained by adding the dimension D (refer to FIG. 3A) of the upper fixing parts 16a, 16b, 16c, and 16d (lower fixing parts 17a, 17b, 17c, and 17d) in the longitudinal direction, and the dimension L of the upper inclined parts 18a, 18b, 18c, and 18d (lower inclined parts 19a, 19b, 19c, and 19d) in the longitudinal direction.

The upper fixing parts 16a, 16b, 16c, and 16d (lower fixing parts 17a, 17b, 17c, and 17d) are bolted to the upper board 10 while the upper fixing parts 16a, 16b, 16c, and 16d of the seismic isolation plates 15a, 15b, 15c, and 15d do not overlap each other, and the lower fixing parts 17a, 17b, 17c, and 17d of the seismic isolation plates 15a, 15b, 15c, and 15d are also bolted to the lower board 11 while the lower fixing parts 17a, 17b, 17c, and 17d of the seismic isolation plates 15*a*, 15*b*, 15*c*, and 15*d* do not overlap each other. Thus, the dimension D of the upper fixing parts 16*a*, 16*b*, 16*c*, and 16*d* (lower fixing parts 17*a*, 17*b*, 17*c*, and 17*d*) in the longitudinal direction is a short dimension (D=150 mm) required for bolt fixing, which is sufficient.

In this manner, the dimension (D+L=150 mm+700 mm) obtained by adding the dimension D (=150 mm) of the upper fixing parts 16*a*, 16*b*, 16*c*, and 16*d* (lower fixing parts 17*a*, 17*b*, 17*c*, and 17*d*) in the longitudinal direction, and the dimension L (=700 mm) of the upper inclined parts 18*a*, 18*b*, 18*c*, and 18*d* (lower inclined parts 19*a*, 19*b*, 19*c*, and 19*d*) in the longitudinal direction corresponds to the limit value (850 mm) of the bending depth of a general steel sheet bending machine.

Here, it is possible to easily manufacture the four seismic isolation plates 15*a*, 15*b*, 15*c*, and 15*d* by using a general steel sheet bending machine, as the dimension (D+L) obtained by adding the dimension D of the upper fixing parts 16*a*, 16*b*, 16*c*, and 16*d* (lower fixing parts 17*a*, 17*b*, 17*c*, and 17*d*) in the longitudinal direction, and the dimension L of the upper inclined parts 18*a*, 18*b*, 18*c*, and 18*d* (lower inclined parts 19*a*, 19*b*, 19*c*, and 19*d*) in the longitudinal direction sets the relationship with the bending height H between the upper fixing part 16*a* and the lower fixing part 17*a* to be (D+L)≤H×1.7.

In addition, in the four seismic isolation plates 15*a*, 15*b*, 15*c*, and 15*d*, when the upper fixing parts 16*a*, 16*b*, 16*c*, and 16*d* are fixed to the upper board 10 by welding without overlapping each other, and the lower fixing parts 17*a*, 17*b*, 17*c*, and 17*d* are fixed to the upper board 10 by welding without overlapping each other, the dimension D of the upper fixing parts 16*a*, 16*b*, 16*c*, and 16*d* (lower fixing parts 17*a*, 17*b*, 17*c*, and 17*d*) in the longitudinal direction is approximately 10 mm, which is sufficient (D≥10 mm).

Meanwhile, the minimum required dimension L of the upper inclined parts 18*a*, 18*b*, 18*c*, and 18*d* (lower inclined parts 19*a*, 19*b*, 19*c*, and 19*d*) in the longitudinal direction for ensuring the deformability of 400 mm to 600 mm is 400 mm, and at this time, D=850 mm−400 mm=450 mm. Therefore, the range of D is 10 mm≤D≤450 mm.

Therefore, the seismic isolation plates 15*a*, 15*b*, 15*c*, and 15*d* of the first embodiment are set to 10 mm≤D≤450 mm and have a shape having a relationship of (D+L)≤H×1.7. Accordingly, since the seismic isolation plates 15*a*, 15*b*, 15*c*, and 15*d* can be easily manufactured by using a general steel sheet bending machine, the parts price of the seismic isolation plates 15*a*, 15*b*, 15*c*, and 15*d* and the manufacturing cost of the steel damper for seismic isolation 6 can be suppressed.

Furthermore, since the vertical distance between the damper upper structure 4 and the damper lower structure 5 differs depending on the installation location of the steel damper for seismic isolation 6, in the first embodiment, the plurality of types of upper jigs 12 having different heights of the rib plate 12*c* and the plurality of types of lower jigs 13 having different heights of the rib plate 13*c* are prepared, and the predetermined upper jig 12 and lower jig 13 corresponding to the vertical distance between the damper upper structure 4 and the damper lower structure 5 are selected and arranged. Therefore, the relative displacement between the structure 1 and the foundation 2 due to the seismic motion is reliably transmitted to the steel damper for seismic isolation 6 installed between the damper upper structure 4 and the damper lower structure 5, and a large amount of energy of seismic motion can be absorbed.

Second Embodiment

Figure 7:
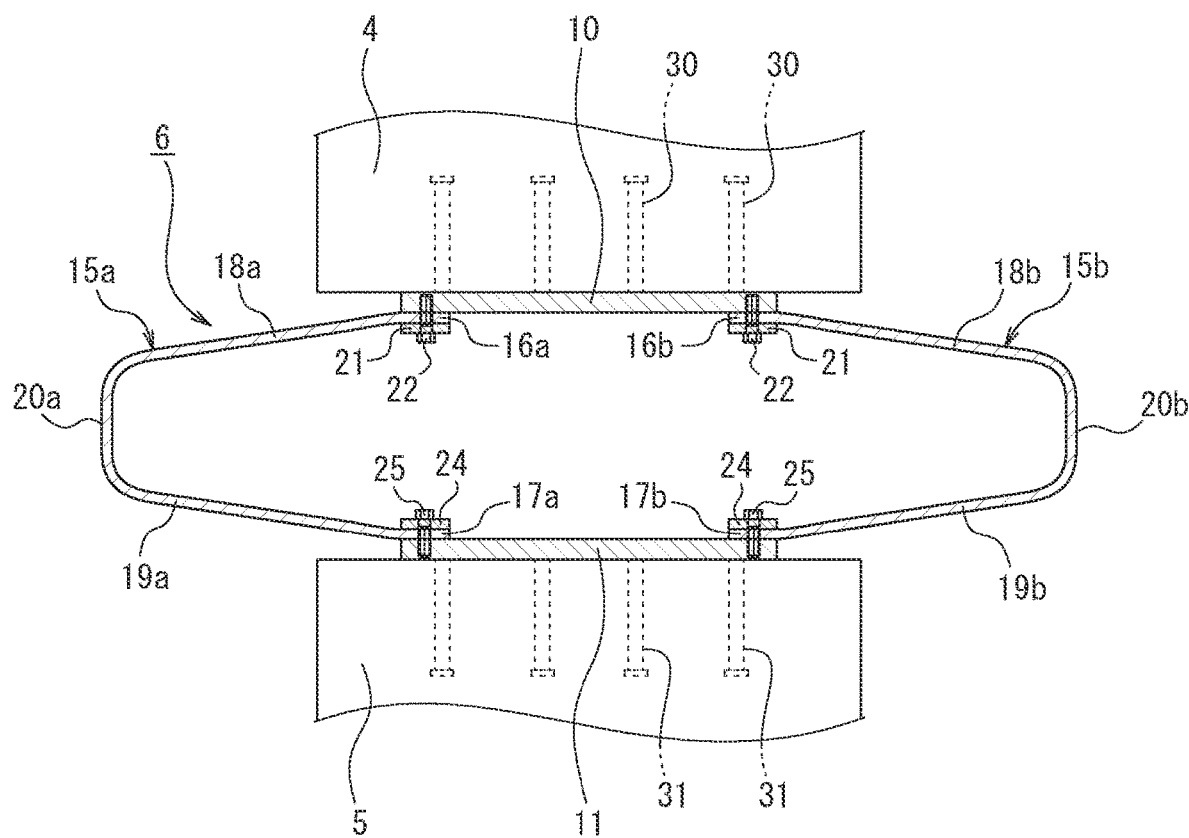
FIG. 7 is a vertical sectional view illustrating a steel damper for seismic isolation according to a second embodiment of the present invention.

Next, FIG. 7 illustrates the steel damper for seismic isolation 6 of a second embodiment installed between the damper upper structure 4 and the damper lower structure 5. The steel damper for seismic isolation 6 of the present embodiment also includes four seismic isolation plates 15*a*, 15*b*, 15*c*, and 15*d* extending in the cross direction in a plan view similar to the first embodiment. However, FIG. 7 illustrates only the seismic isolation plates 15*a* and 15*b* that face each other in a straight line in a plan view.

A plurality of stud bolts 30 is protruded and fixed to the upper surface of the upper board 10 of the present embodiment, and a plurality of stud bolts 31 is protruded and fixed to the lower surface of the lower board 11.

Further, when the damper upper structure 4 made of reinforced concrete is formed, the stud bolt 30 of the upper board 10 is embedded in the concrete, and accordingly, the upper board 10 is integrated with the lower surface of the damper upper structure 4.

Further, when the damper lower structure 5 made of reinforced concrete is formed, the stud bolt 31 of the lower board 11 is embedded in the concrete, and accordingly, the lower board 11 is integrated with the upper surface of the damper lower structure 5.

In addition, the upper fixing parts 16*a*, 16*b*, 16*c*, and 16*d* of the four seismic isolation plates 15*a*, 15*b*, 15*c*, and 15*d* do not overlap each other and are bolted to the upper board 10. Further, the lower fixing parts 17*a*, 17*b*, 17*c*, and 17*d* of the four seismic isolation plates 15*a*, 15*b*, 15*c*, and 15*d* also do not overlap each other and are bolted to the upper board 10.

The actions and effects of the steel damper for seismic isolation 6 of the second embodiment will be described.

According to the steel damper for seismic isolation 6 installed between the damper upper structure 4 and the damper lower structure 5 of the present embodiment, the same effect as the effect of the first embodiment can be obtained, and when the vertical distance between the damper upper structure 4 and the damper lower structure 5 is narrow, without using the upper jig 12 and the lower jig 13, the steel damper for seismic isolation 6 can be reliably installed between the damper upper structure 4 and the damper lower structure 5, the relative displacement between the structure 1 and the foundation 2 due to the seismic motion is reliably transmitted, and a large amount of energy of seismic motion can be absorbed.

Third Embodiment

Figure 8:
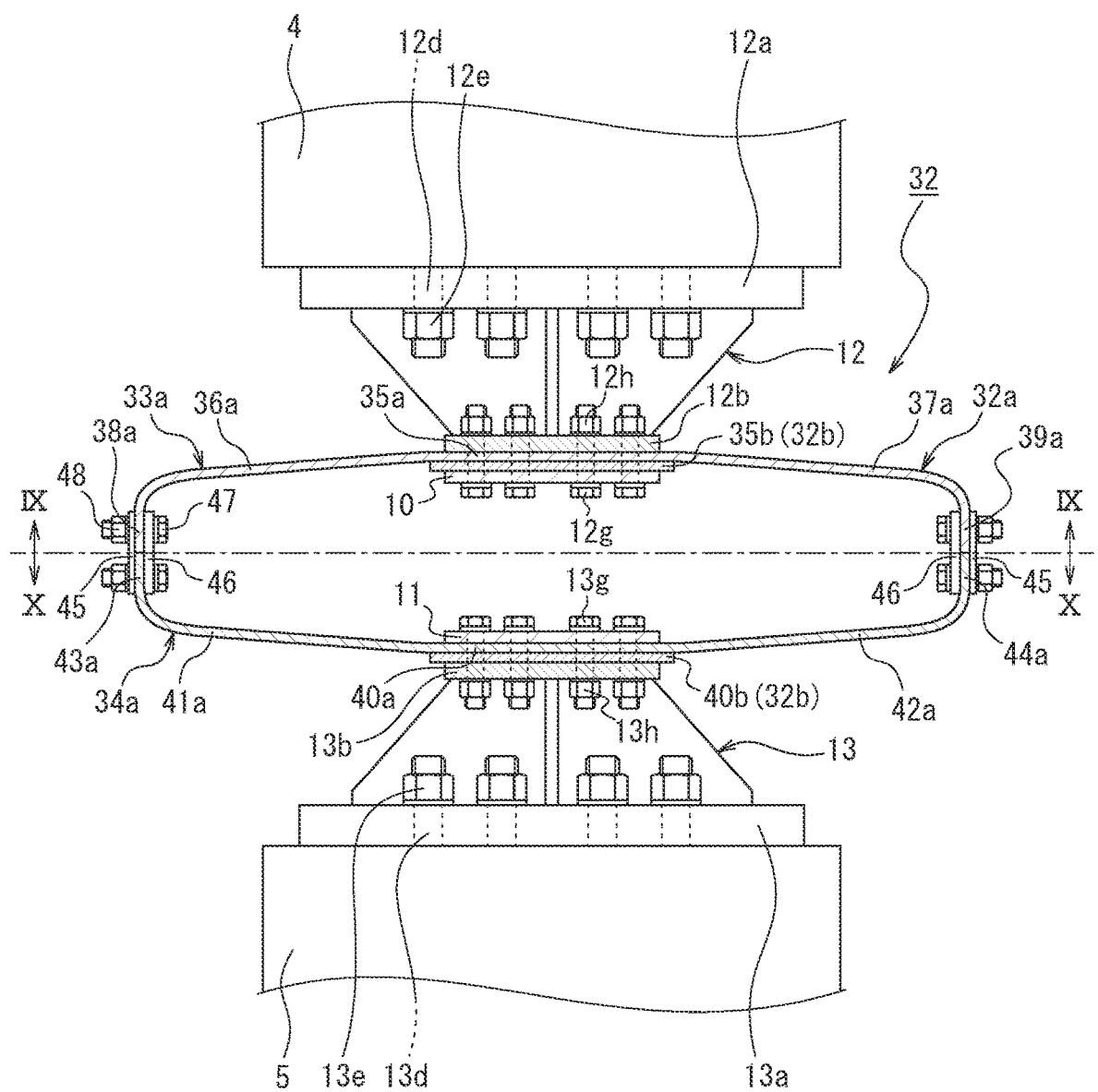
FIG. 8 is a vertical sectional view illustrating a main part of a steel damper for seismic isolation according to a third embodiment of the present invention.
Figure 9:
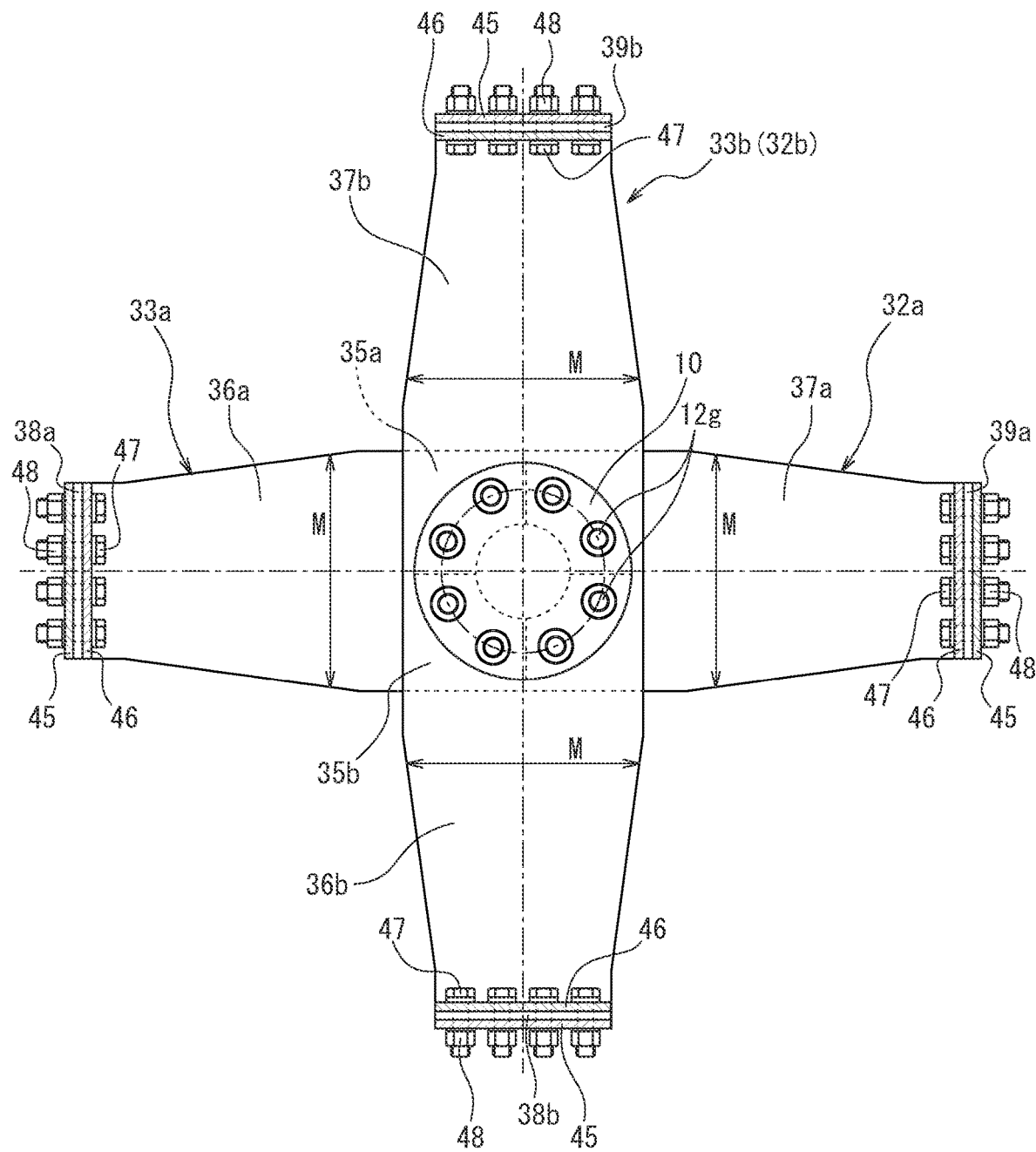
FIG. 9 is a view taken along the line IX-IX of FIG. 8.
Figure 10:
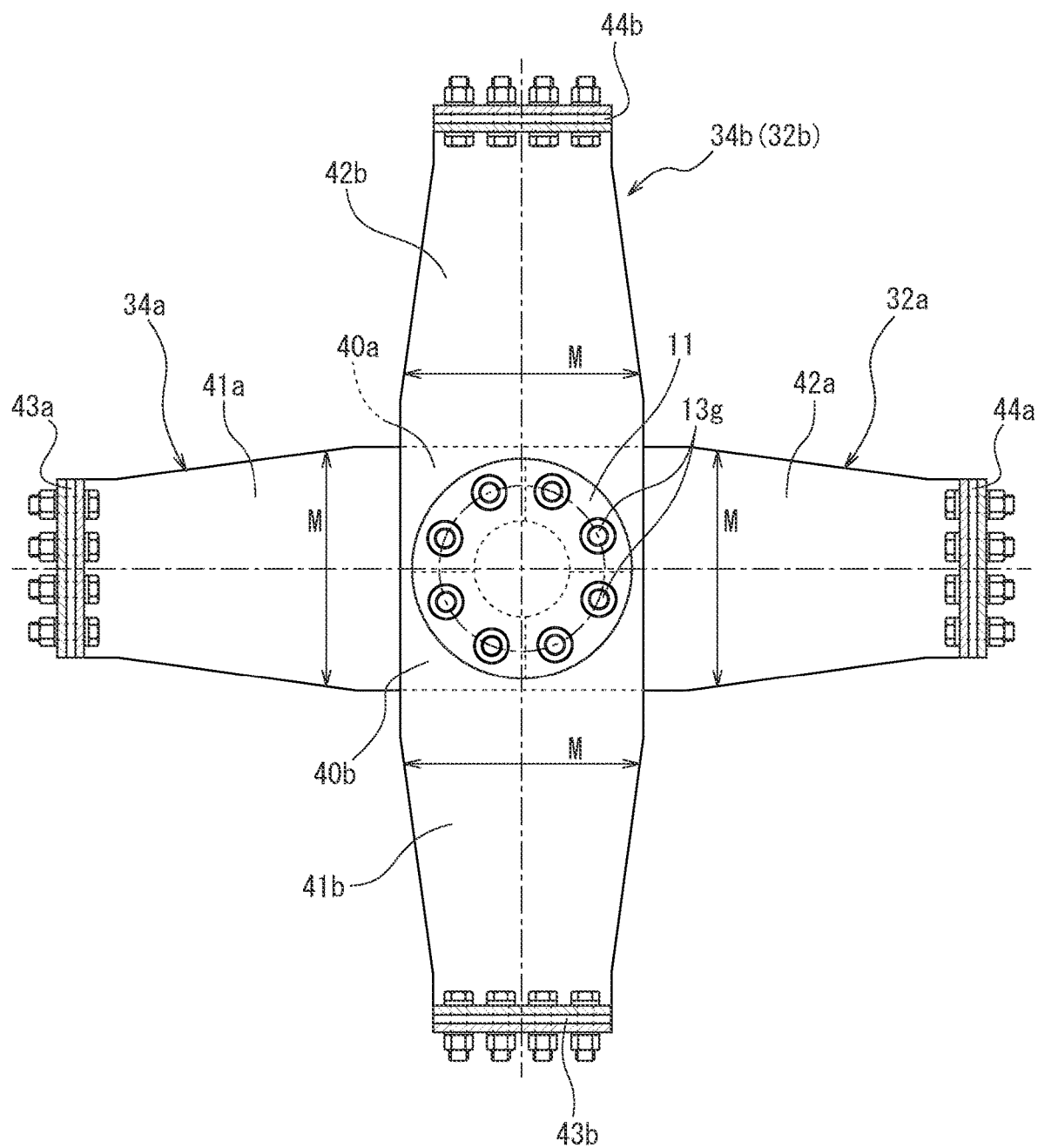
FIG. 10 is a view taken along the line X-X of FIG. 8.

Next, FIGS. 8 to 10 illustrate a steel damper for seismic isolation 32 of a third embodiment. In the present embodiment, the upper board 10 of the steel damper for seismic isolation 32 is fixed to the damper upper structure 4 via the upper jig 12, the lower board 11 of the steel damper for seismic isolation 32 is fixed to the damper lower structure 5 via the lower jig 13 to be at the same position in a plan view with respect to the upper board 10, and first and second seismic isolation plates 32*a* and 32*b* fixed to the upper board 10 and the lower board 11 are arranged extending in the cross direction in a plan view.

As illustrated in FIG. 8, the first seismic isolation plate 32*a* includes an upper split steel sheet 33*a* and a lower split steel sheet 34*a*. The upper split steel sheet 33*a* includes an upper fixing part 35*a* provided at the center part in the longitudinal direction; a pair of upper inclined parts 36*a* and 37*a* bent diagonally downward from both ends of the upper fixing part 35*a* in the longitudinal direction; and upper connecting parts 38*a* and 39*a* bent downward from the end parts of the pair of the upper inclined parts 36*a* and 37*a*. Further, the lower split steel sheet 34*a* includes a lower fixing part 40*a* provided at the center part in the longitudinal direction; a pair of lower inclined parts 41a and 42a bent diagonally upward from both ends of the lower fixing part 40a in the longitudinal direction; and lower connecting parts 43a and 44a bent upward from the end parts of the pair of the lower inclined parts 41a and 42a.

The upper split steel sheet 33a and the lower split steel sheet 34a are integrated by connecting the upper connecting parts 38a and 39a and the lower connecting parts 43a and 44a. In other words, as illustrated in FIG. 8, in a state where the upper connecting parts 38a and 39a and the lower connecting parts 43a and 44a face each other, by sandwiching the facing parts between fourth and fifth splice plates 45 and 46, inserting connecting bolts 47 to the fourth and fifth splice plates 45 and 46, and screwing the connecting bolts 47 with nuts 48, the upper split steel sheet 33a and the lower split steel sheet 34a are integrated to form the first seismic isolation plate 32a. The pair of upper inclined parts 36a, 37a and the pair of lower inclined parts 41a and 42a of the first seismic isolation plate 32a have a shape in which the width dimension M gradually decreases while being separated from the upper fixing part 35a and the lower fixing part 40a.

Meanwhile, the second seismic isolation plate 32b also includes an upper split steel sheet 33b and a lower split steel sheet 34b, as illustrated in FIGS. 9 and 10. The upper split steel sheet 33b includes an upper fixing part 35b provided at the center part in the longitudinal direction; a pair of upper inclined parts 36b and 37b bent diagonally downward from both ends of the upper fixing part 35b in the longitudinal direction; and upper connecting parts 38b and 39b bent downward from the end parts of the pair of the upper inclined parts 36b and 37b. Further, the lower split steel sheet 34b includes a lower fixing part 40b provided at the center part in the longitudinal direction; a pair of lower inclined parts 41b and 42b bent diagonally upward from both ends of the lower fixing part 40b in the longitudinal direction; and lower connecting parts 43b and 44b bent upward from the end parts of the pair of the lower inclined parts 41b and 42b.

In addition, in a state where the upper connecting parts 38b and 39b and the lower connecting parts 43b and 44b face each other, as illustrated in FIGS. 9 and 10, by sandwiching the facing parts between fourth and fifth splice plates 45 and 46, inserting the connecting bolts 47 into the through-holes formed in the fourth and fifth splice plates 45 and 46, the upper connecting parts 38b and 39b, and the lower connecting parts 43b and 44b, and screwing the connecting bolts 47 with the nuts 48, the upper split steel sheet 33b and the lower split steel sheet 34b are integrated to form the second seismic isolation plate 32b. The pair of upper inclined parts 36b and 37b and the pair of lower inclined parts 41b and 42b of the second seismic isolation plate 32b have a shape in which the width dimension M gradually decreases while being separated from the upper fixing part 35b and the lower fixing part 40b.

Here, the upper connecting parts 38a and 39a and the lower connecting parts 43a and 44a of the first seismic isolation plate 32a are sandwiched between the fourth and fifth splice plates 45 and 46, inserted into the connecting bolts 47, and screwed with the nuts 48 to be fixed, and the upper connecting parts 38b and 39b and the lower connecting parts 43b and 44b of the second seismic isolation plate 32b are also sandwiched between the fourth and fifth splice plates 45 and 46, inserted into the connecting bolts 47, and screwed with the nuts 48 to be fixed. However, the upper connecting parts 38a and 39a and the lower connecting parts 43a and 44a of the first seismic isolation plate 32a may be fixed by welding, and the upper connecting parts 38b and 39b and the lower connecting parts 43b and 44b of the second seismic isolation plate 32b may be fixed by welding.

The first and second seismic isolation plates 32a and 32b having the above-described configuration are arranged to extend in the cross direction in a plan view, and the upper fixing parts 35a and 35b and the lower fixing parts 40a and 40b are overlapped with each other.

Further, by arranging the overlapping upper fixing parts 35a and 35b below the upper board side plate 12b of the upper jig 12, arranging the upper board 10 below the upper fixing parts 35a and 35b, inserting the connecting bolts 12g into the through-holes formed in the upper board side plate 12b, the upper fixing parts 35a and 35b, and the upper board 10, and screwing the connecting bolts 12g with the nut 12h, the upper board 10 of the seismic isolation damper 32 is fixed to the damper upper structure 4 via the upper jig 12.

Further, by arranging the overlapping lower fixing parts 40a and 40b above the lower board side plate 13b of the lower jig 13, arranging the lower board 11 above the lower fixing parts 40a and 40b, inserting the connecting bolts 13g into the through-holes formed in the lower board side plate 13b, the lower fixing parts 40a and 40b, and the lower board 11, and screwing the connecting bolts 13g with the nut 13h, the lower board 11 of the seismic isolation damper 32 is fixed to the damper lower structure 5 via the lower jig 13.

The actions and effects of the seismic isolation damper 32 of the third embodiment will be described.

Since the first and second seismic isolation plates 32a and 32b of the seismic isolation damper 32 of the present embodiment are arranged in the cross direction in a plan view, no matter which direction the seismic motion acts in the horizontal plane, by performing deformation of the upper inclined parts 36a, 37a, 36b, and 37b and the lower inclined parts 41a, 42a, 41b, and 42b both in the shear direction and the bending direction, the energy of seismic motion is absorbed.

Further, the width dimension M of the upper inclined parts 36a, 37a, 36b, and 37b and the lower inclined parts 41a, 42a, 41b, and 42b gradually decreases while being separated from the upper fixing parts 35a and 35b and the lower fixing parts 40a and 40b. Therefore, even when the twist occurs, the energy of seismic motion can be efficiently absorbed.

Further, the first seismic isolation plate 32a includes the upper split steel sheet 33a in which the upper connecting parts 38a and 39a having a shallow bending depth are formed at both end parts in the longitudinal direction, and the lower split steel sheet 34a in which the lower connecting parts 43a and 44a having a shallow bending depth are formed at both end parts in the longitudinal direction. Therefore, the dimensions of the upper inclined parts 36a and 37a and the lower inclined parts 41a and 42a in the longitudinal direction can be set large. Further, the second seismic isolation plate 32b includes the upper split steel sheet 33b in which the upper connecting parts 38b and 39b having a shallow bending depth are formed at both end parts in the longitudinal direction, and the lower split steel sheet 34b in which the lower connecting parts 43b and 44b having a shallow bending depth are formed at both end parts in the longitudinal direction. Therefore, the dimensions of the upper inclined parts 36b and 37b and the lower inclined parts 41b and 42b in the longitudinal direction can be set large. Accordingly, the seismic isolation damper 32 of the present embodiment can have the deformability required for a large relative displacement (approximately 400 mm to 600 mm)

between the structure 1 and the foundation 2, and thus the energy of seismic motion can be sufficiently absorbed.

Fourth Embodiment

Next, FIGS. 11 to 14 illustrate a steel damper for seismic isolation 6 of a fourth embodiment.

Figure 11:
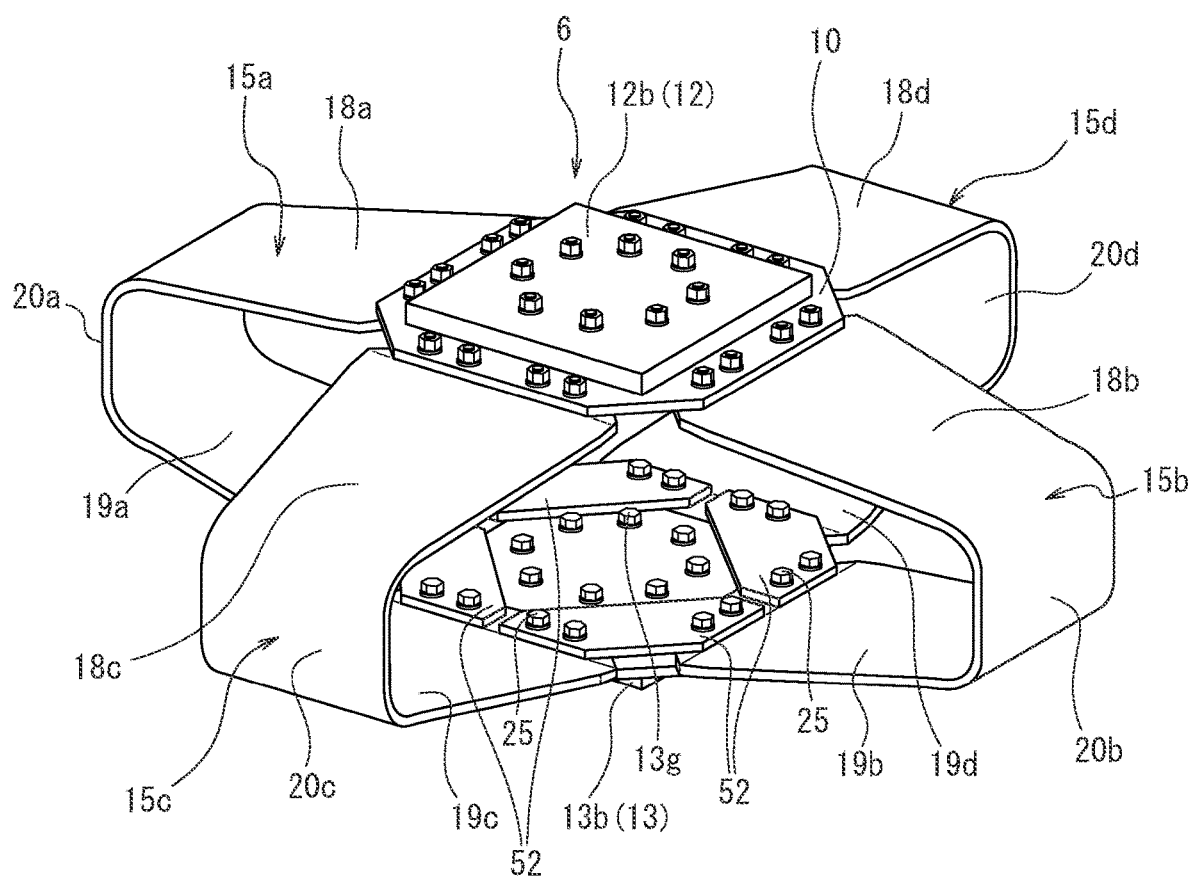
FIG. 11 is a perspective view illustrating a steel damper for seismic isolation according to a fourth embodiment of the present invention.
Figure 12:
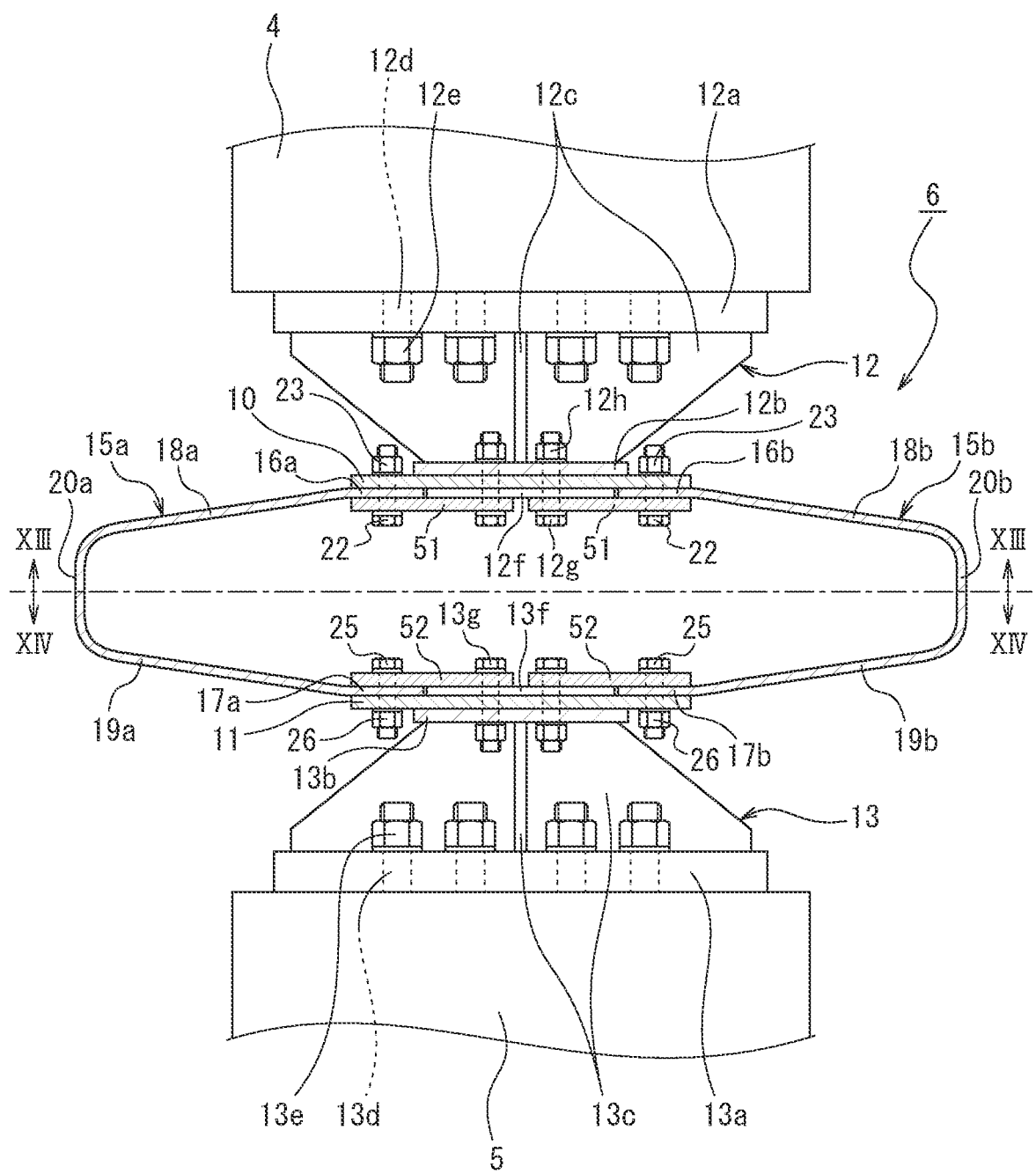
FIG. 12 is a vertical sectional view illustrating a main part of the steel damper for seismic isolation according to the fourth embodiment.

As illustrated in FIGS. 11 and 12, similar to the steel damper for seismic isolation 6 of the first embodiment, the steel damper for seismic isolation 6 of the present embodiment includes the upper board 10 fixed to the damper upper structure 4 via the upper jig 12; the lower board 11 fixed to the damper lower structure 5 via the lower jig 13 to be at the same position in the plan view with respect to the upper board 10; and four seismic isolation plates 15a, 15b, 15c, and 15d that are fixed to the upper board 10 and the lower board 11, and extend in the cross direction orthogonal to each other in a plan view.

Figure 13:
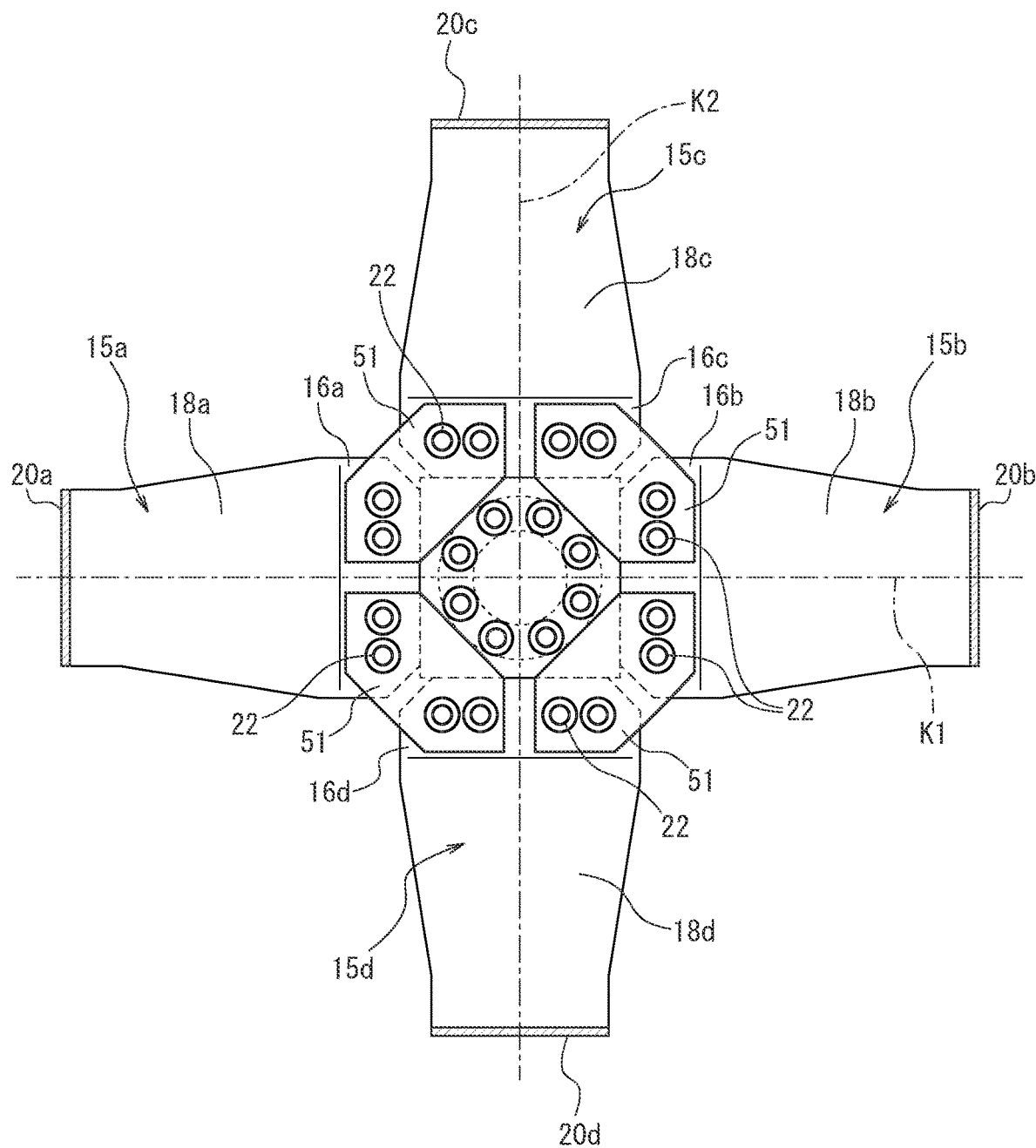
FIG. 13 is a view taken along the line XIII-XIII of FIG. 12.

In the steel damper for seismic isolation 6 of the present embodiment, as illustrated in FIG. 13, in the configuration different from the configuration of the steel damper for seismic isolation 6 of the first embodiment, third splice plates 51 that abut on the lower surfaces of the upper fixing parts are arranged to straddle the adjacent upper fixing parts 16a and 16c, the adjacent upper fixing parts 16b and 16c, the adjacent upper fixing parts 16b and 16d, and the adjacent upper fixing parts 16a and 16d of the four seismic isolation plates 15a, 15b, 15c, and 15d. Then, by inserting the connecting bolts 22 into the through-holes formed on the third splice plates 51 and screwing the connecting bolts 22 with the nuts 23, as illustrated in FIG. 12, the upper fixing parts 16a, 16b, 16c, and 16d of the four seismic isolation plates 15a, 15b, 15c, and 15d are bolted to the upper board 10 without overlapping each other.

Figure 14:
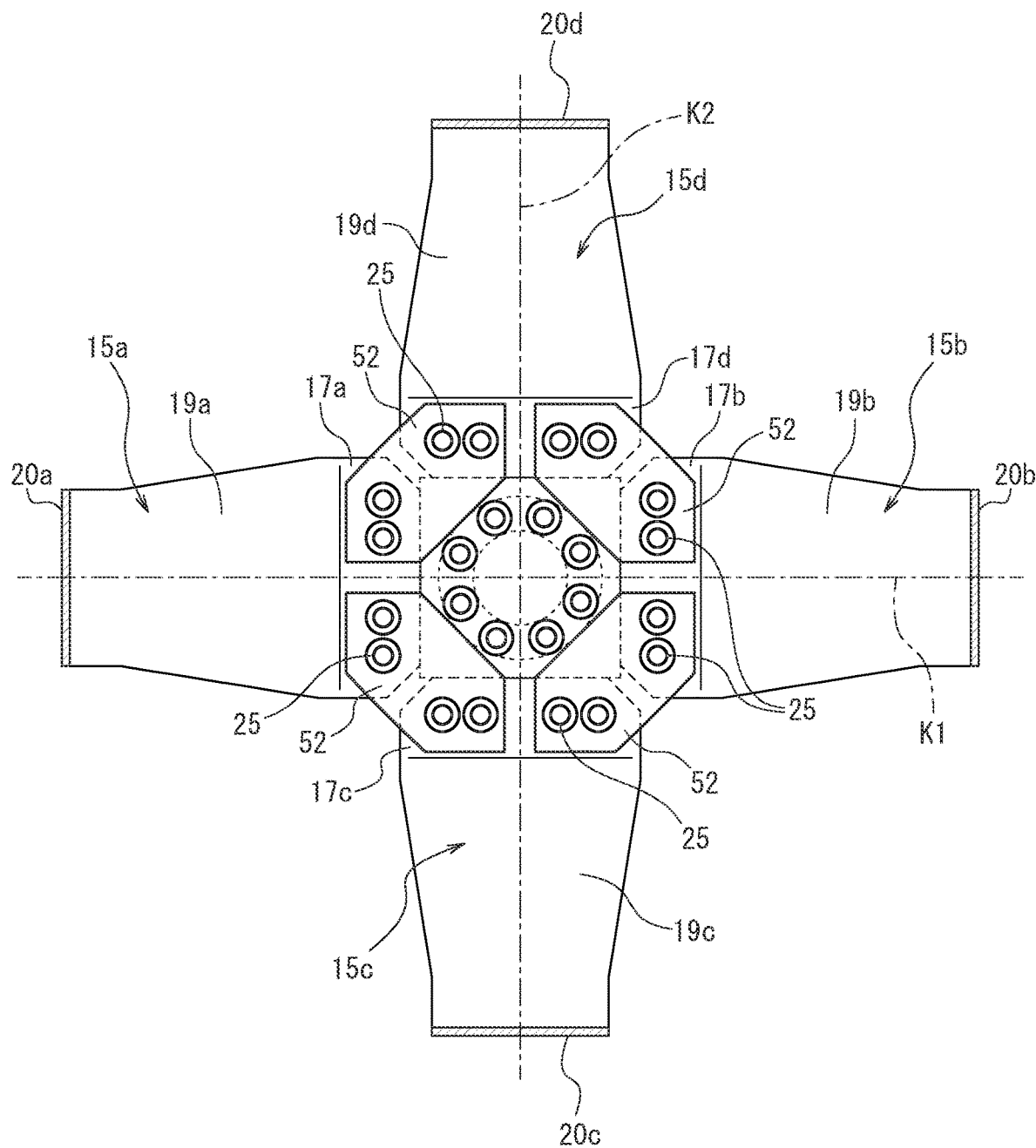
FIG. 14 is a view taken along the line XIV-XIV of FIG. 12.

In addition, as illustrated in FIG. 14, third splice plates 52 that abut on the upper surfaces of the lower fixing parts are arranged to straddle the adjacent lower fixing parts 17a and 17d, the adjacent lower fixing parts 17b and 17d, the adjacent lower fixing parts 17b and 17c, and the adjacent lower fixing parts 17a and 17c of the four seismic isolation plates 15a, 15b, 15c, and 15d. Then, by inserting the connecting bolts 25 into the through-holes formed on the third splice plates 52 and screwing the connecting bolts 25 with the nuts 26, as illustrated in FIG. 12, the lower fixing parts 17a, 17b, 17c, and 17d of the four seismic isolation plates 15a, 15b, 15c, and 15d are bolted to the lower board 11 without overlapping each other.

According to the steel damper for seismic isolation 6 installed between the damper upper structure 4 and the damper lower structure 5 of the present embodiment, the upper fixing parts 16a, 16b, 16c, and 16d of the seismic isolation plates 15a, 15b, 15c, and 15d are firmly tightened and fixed by the connecting bolts 22 and the nuts 23 in a state of being sandwiched between the upper board 10 and the four third splice plates 51 from the thickness direction, and the lower fixing parts 17a, 17b, 17c, and 17d of the seismic isolation plates 15a, 15b, 15c, and 15d are firmly tightened and fixed by the connecting bolts 25 and the nuts 26 in a state of being sandwiched between the lower board 11 and the four third splice plates 52 from the thickness direction.

Further, each of the four third splice plates 51 is arranged to straddle the pair of adjacent upper fixing parts 16a and 16c, the pair of adjacent upper fixing parts 16b and 16c, the pair of adjacent upper fixing parts 16b and 16d, and the pair of adjacent upper fixing parts 16a and 16d of the seismic isolation plates 15a, 15b, 15c, and 15d. Accordingly, all of the upper fixing parts 16a, 16b, 16c, and 16d including the end parts of the upper fixing parts 16a, 16b, 16c, and 16d are restrained, and local plastic deformation of the upper fixing parts 16a, 16b, 16c, and 16d can be deterred. Further, by suppressing the local deformation of the upper fixing parts 16a, 16b, 16c, and 16d, the stress concentration of the connecting bolt 22 can be prevented. Further, each of the four third splice plates 51 is arranged to straddle the pair of adjacent lower fixing parts 17a and 17d, the pair of adjacent lower fixing parts 17b and 17d, the pair of adjacent lower fixing parts 17b and 17c, and the pair of adjacent lower fixing parts 17a and 17c of the seismic isolation plates 15a, 15b, 15c, and 15d. Accordingly, all of the lower fixing parts 17a, 17b, 17c, and 17d including the end parts of the lower fixing parts 17a, 17b, 17c, and 17d are restrained, local plastic deformation of the lower fixing parts 17a, 17b, 17c, and 17d can be deterred, and the stress concentration of the bolt 25 can also be prevented.

Therefore, in the steel damper for seismic isolation 6 of the present embodiment, local plastic deformation of the upper fixing parts 16a, 16b, 16c, and 16d and the lower fixing parts 17a, 17b, 17c, and 17d when the energy of seismic motion is transmitted is reliably deterred, and absorbency of energy of seismic motion can be prevented from decreasing.

Fifth Embodiment

Next, in a fifth embodiment illustrated in FIGS. 15 to 19, a range of an appropriate inclination angle θ of the four seismic isolation plates 15a, 15b, 15c, and 15d, which are used in the steel damper for seismic isolation 6 of the first, second, and fourth embodiments, is set.

Figure 15:
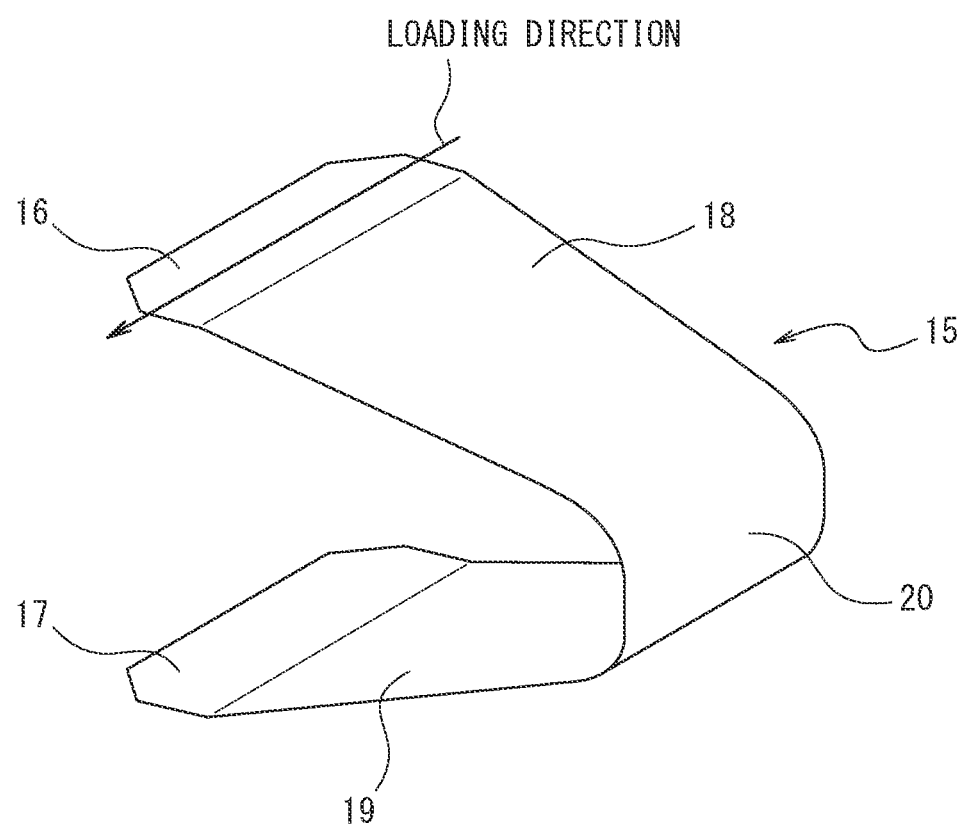
FIG. 15 is a perspective view illustrating an FEM analysis model of a seismic isolation plate according to a fifth embodiment of the present invention.

In the present embodiment, an FEM analysis model 15 of the seismic isolation plate illustrated in FIG. 15 is used. The FEM analysis model 15 of the seismic isolation plate of FIG. 15 has a structure corresponding to the seismic isolation plate 15a illustrated in FIG. 3A, the upper fixing part 16 corresponds to the upper fixing part 16a of the seismic isolation plate 15a, the lower fixing part 17 corresponds to the lower fixing part 17a of the seismic isolation plate 15a, the upper inclined part 18 and the lower inclined part 19 correspond to the upper inclined part 18a and the lower inclined part 19a of the seismic isolation plate 15a, and the connecting part 20 corresponds to the connecting part 20a of the seismic isolation plate 15a. Further, the FEM analysis model 15 of the seismic isolation plate of FIG. 15 has a structure corresponding to other seismic isolation plates 15b, 15c, and 15d.

Figure 16:
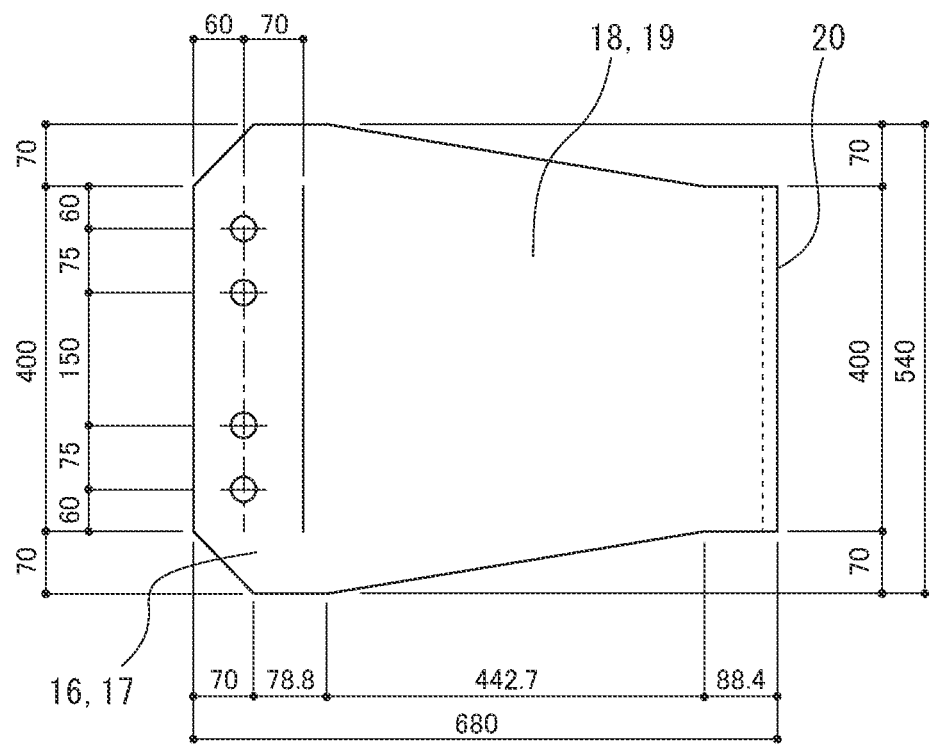
FIG. 16 is a view illustrating the dimensions and shapes of predetermined parts of the FEM analysis model of the seismic isolation plate according to the fifth embodiment.

The FEM analysis model of a seismic isolation plate 15 includes the upper fixing part 16, the lower fixing part 17, the upper inclined part 18, the lower inclined part 19, and the connecting part 20 having the dimensions and shapes illustrated in FIG. 16. As illustrated in FIGS. 17A to 17G, a plurality of types of FEM analysis models (models M1 to M7) having different inclination angles θ is provided.

Figure 17A:
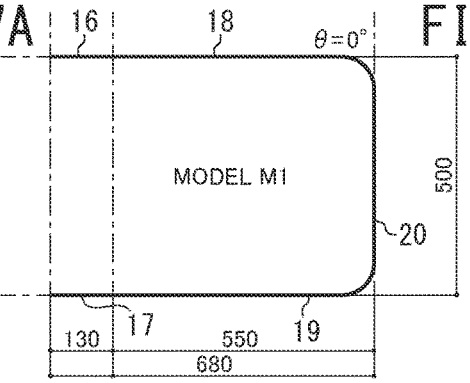
FIG. 17 is a side view illustrating the FEM analysis models of a plurality of types of seismic isolation plates having different inclination angles in the fifth embodiment.
Figure 17B:
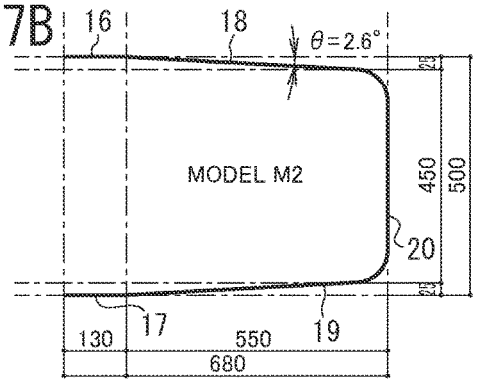
Figure 17C:
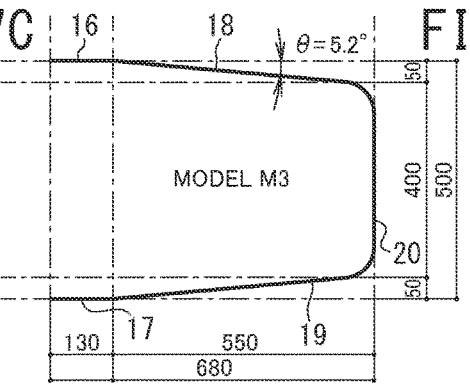
Figure 17D:
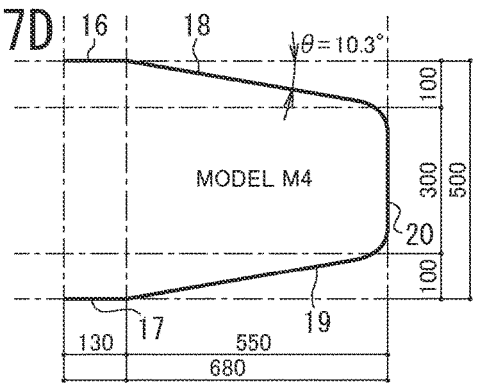
Figure 17E:
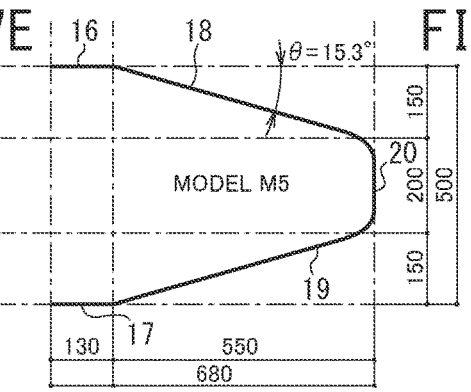
Figure 17F:
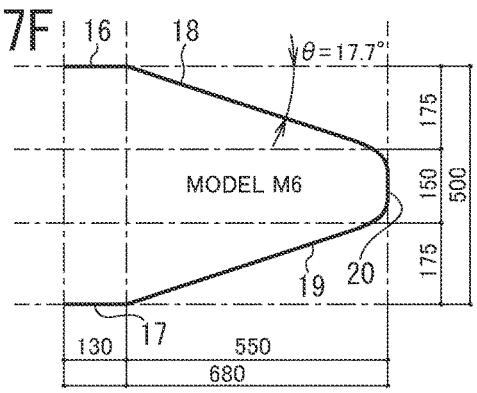
Figure 17G:
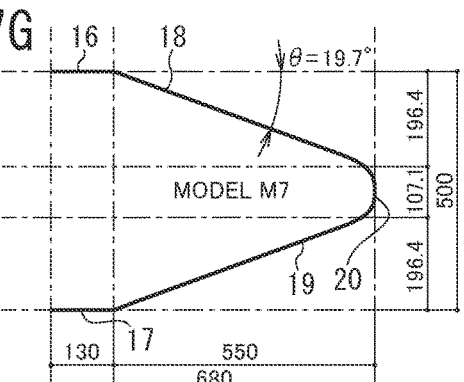

FIG. 17A illustrates the model M1 as a comparative example in which the inclination angle θ is 0°, and FIGS. 17B to 17G illustrate the models M2 to M7 in which the inclination angle is set to 2.6° to 19.7°. The unit of the shape dimension illustrated in FIGS. 16 and 17B to 17G is (mm).

Then, by setting the lower fixing parts 17 of the models M1 to M7 in a fixed state, applying a load in the direction (loading direction) along the longitudinal direction of the upper fixing part 16, and displacing the upper fixing part 16 to 400 mm in the loading direction, the equivalent plastic strain of the upper inclined part 18 and the connecting part 20 was confirmed.

Figure 18:
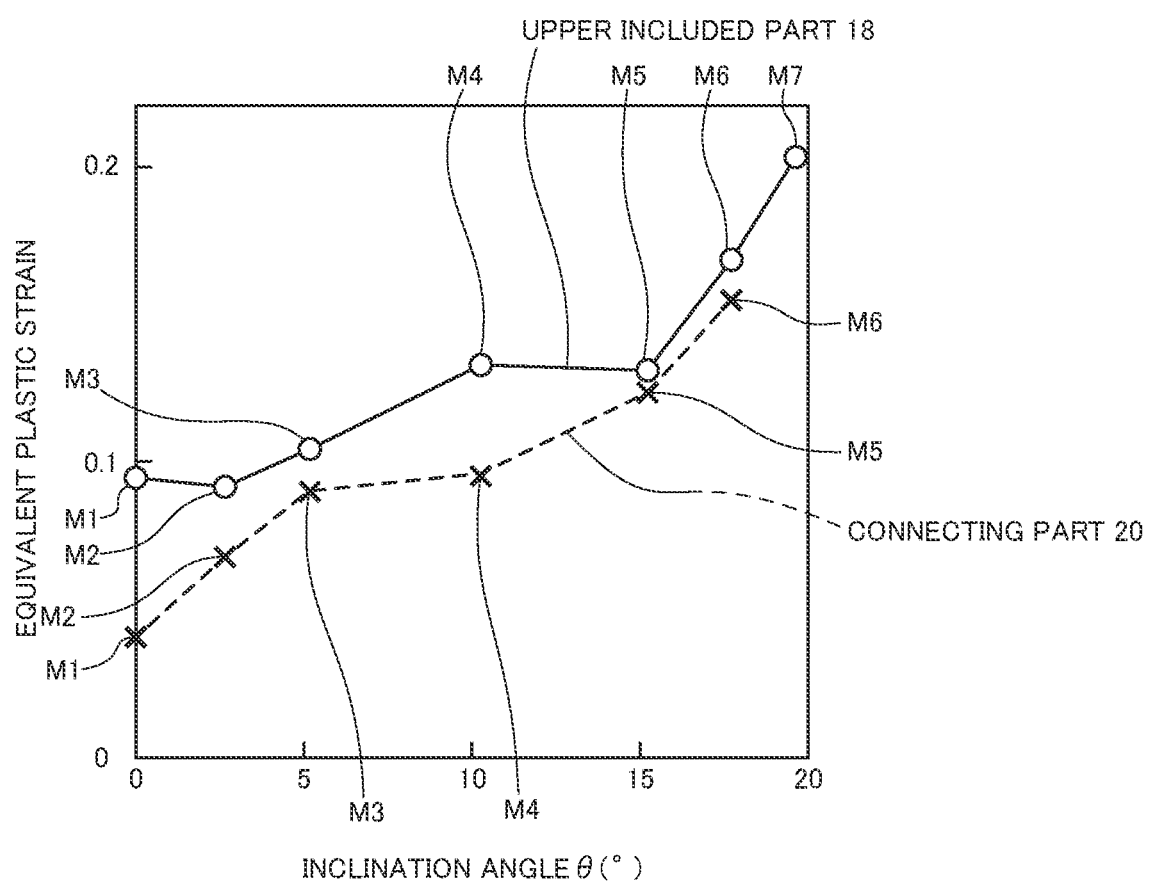
FIG. 18 is a diagram illustrating equivalent plastic strains of the FEM analysis models of the plurality of types of seismic isolation plates having different inclination angles in the fifth embodiment.

FIG. 18 is a diagram in which the maximum value of the equivalent plastic strain of the upper inclined part 18 and the connecting part 20 of the models M1 to M7 is plotted with the inclination angle θ on the horizontal axis and the equivalent plastic strain on the vertical axis. In a case of the model M1 (θ=0°) and the model M2 (θ=2.6°), the equivalent plastic strain of the connecting part 20 is significantly smaller than the equivalent plastic strain of the upper inclined part 18, and thus the absorbency of energy of seismic motion due to plastic deformation cannot be exhibited. Further, in a case of the model M6 (θ=17.7°) and the model M7 (θ=19.7°), the equivalent plastic strain significantly increases, and there is a concern that the fatigue durability against repeated load during an earthquake is insufficient. Meanwhile, in a case of the model M3 (θ=5.2°), the model M4 (θ=10.3°), and the model M5 (θ=15.3°), the equivalent plastic strain of the upper inclined part 18 and the connecting part 20 is relatively uniform, and the entire FEM analysis model 15 is plastically deformed uniformly.

Figure 19:
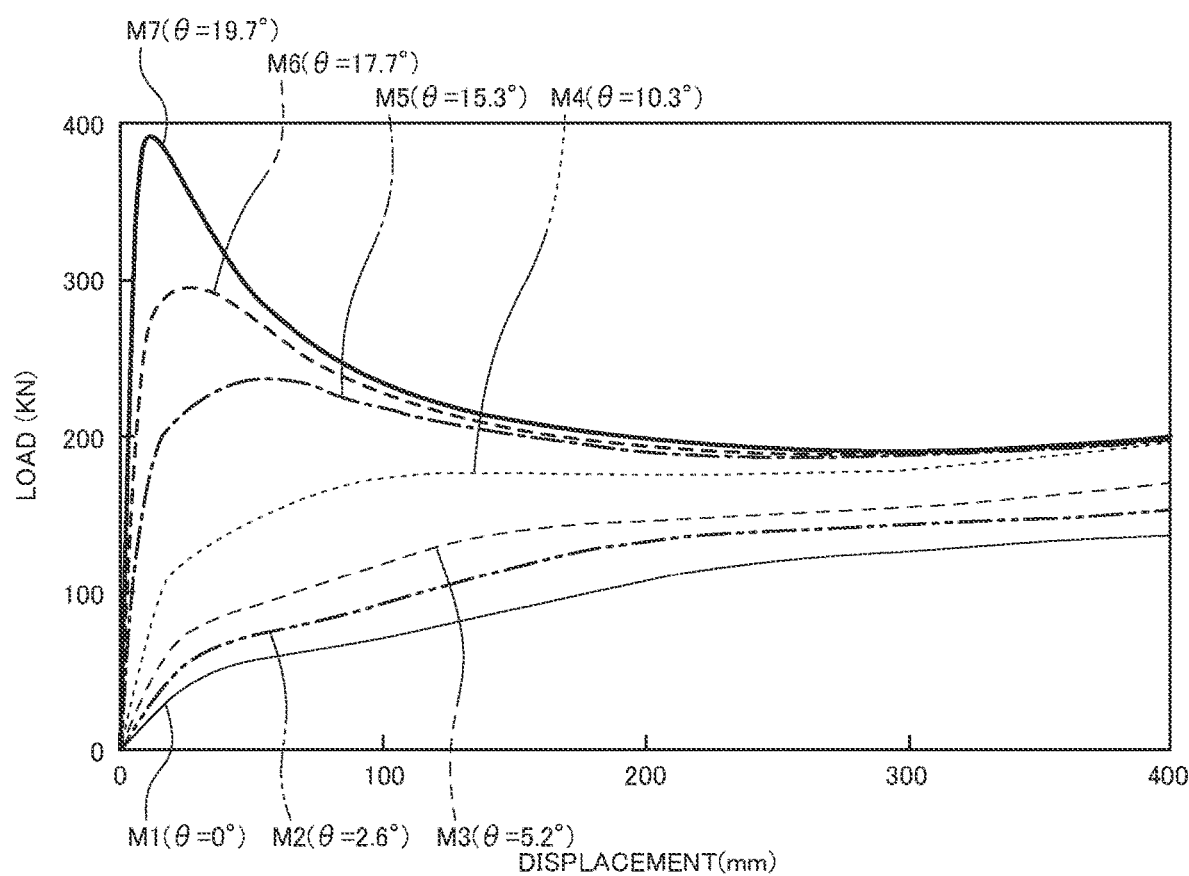
FIG. 19 is a diagram illustrating a relationship between displacement and a load of the FEM analysis models of the plurality of types of seismic isolation plates having different inclination angles in the fifth embodiment.

Further, FIG. 19 is a diagram illustrating changes in the load with displacement of the models M1 to M7, with the displacement in the loading direction on the horizontal axis and the load on the vertical axis. From this diagram, it can be seen that the larger the inclination angle θ, the larger the load. In addition, in a case of the model M6 (θ=17.7°) and the model M7 (θ=19.7°), the peak of the load appears at the initial stage of the displacement, the load decreases suddenly as the displacement increases, and thus, when the displacement becomes large, the energy absorbency decreases suddenly, and the performance as a seismic isolation damper is not sufficient.

In this manner, in a case of the model M3 (θ=5.2°), the model M4 (θ=10.3°), and the model M5 (θ=15.3°), the equivalent plastic strain of the upper inclined part 18 and the connecting part 20 is a relatively uniform, there is no sudden decrease in load from the initial peak to the end of the displacement, and thus, it can be seen that the optimum inclination angle θ is $5.2° \leq θ \leq 15.3°$.

Therefore, by setting the inclination angles θ of the four seismic isolation plates 15a, 15b, 15c, and 15d in the range of $5.2° \leq θ \leq 15.3°$, the steel damper for seismic isolation 6 that sufficiently exhibits absorbency of energy of seismic motion can be provided.

REFERENCE SIGNS LIST

1 Structure
2 Foundation
3 Seismic isolation structure
4 Damper upper structure (lower part of structure)
5 Damper lower structure (foundation)
6 Steel damper for seismic isolation
7 Device upper structure
8 Device lower structure
9 Seismic isolation device
10 Upper board
11 Lower board
12 Upper jig
12a Anchor plate
12b Upper board side plate
12c Rib plate
12d Anchor bolt
12e Nut
12f First splice plate
12g Connecting bolt
12h Nut
13 Lower jig
13a Anchor plate
13b Lower board side plate
13c Rib plate
13d Anchor bolt
13e Nut
13f Second splice plate
13g Connecting bolt
13h Nut
15 FEM analysis model of seismic isolation plate
15a, 15b, 15c, 15d Seismic isolation plate
16, 16a, 16b, 16c, 16d Upper fixing part
17, 17a, 17b, 17c, 17d lower fixing part
18, 18a, 18b, 18c, 18d Upper inclined part
19, 19a, 19b, 19c, 19d Lower inclined part
20, 20a, 20b, 20c, 20d Connecting part
21 Third splice plate (upper splice plate)
24 Third splice plate (lower splice plate)
22 Connecting bolt (fastening means)
23 Nut (fastening means)
25 Connecting bolt (fastening means)
26 Nut (fastening means)
30 Stud bolt
31 Stud bolt
32 Steel damper for seismic isolation
32a First seismic isolation plate
32b Second seismic isolation plate
33a, 33b Upper split steel sheet
34a, 34b Lower split steel sheet
35a, 35b Upper fixing part
36a, 37a, 36b, 37b Upper inclined part
38a, 39a, 38b, 39b Upper connecting part
40a, 40b Lower fixing part
41a, 42a, 41b, 42b Lower inclined part
43a, 44a, 43b, 44b Lower connecting part
45 Fourth splice plate
46 Fifth splice plate
47 Connecting bolt
48 Nut
51 Third splice plate (upper splice plate)
52 Third splice plate (lower splice plate)
D Dimension of upper fixing part (lower fixing part) of seismic isolation plate in longitudinal direction
L Dimension of upper inclined part (lower inclined part) of seismic isolation plate in longitudinal direction
H Bending height of seismic isolation plate
θ Inclination angle

The invention claimed is:

1. A steel damper for seismic isolation installed between a lower part of a structure and a foundation, comprising:
an upper board fixed to the lower part of the structure;
a lower board fixed to the foundation to be at the same position in a plan view with respect to the upper board; and
four seismic isolation plates fixed to the upper board and the lower board and extending in a cross direction in a plan view, wherein
the four seismic isolation plates are members obtained by bending a long steel sheet, and include an upper fixing part and a lower fixing part parallel to each other, an upper inclined part and a lower inclined part that are closer to each other while being separated from the upper fixing part and the lower fixing part, and a connecting part that connects the upper inclined part and the lower inclined part to each other,
the four seismic isolation plates are fixed to the upper board at a position where the upper fixing parts do not overlap each other, and are fixed to the lower board at a position where the lower fixing parts do not overlap each other, the upper fixing part is fixed to the upper board by sandwiching the upper fixing part between the upper board and an upper splice plate and tightening the upper board and the upper splice plate by fastening means, the lower fixing part is fixed to the lower board by sandwiching the lower fixing part between the lower board and a lower splice plate and tightening the lower board and the lower splice plate by fastening means, the upper splice plate is on a lower surface of the upper fixing part and the lower splice plate is on the upper surface of the lower fixing part, and a dimension of the upper inclined part and the lower inclined part in a width direction gradually decreases while being separated from the upper fixing part and the lower fixing part.

2. The steel damper for seismic isolation according to claim 1, wherein the seismic isolation plate has a relationship of 10 mm≤D≤450 mm and (D+L)≤H×1.7, where a bending height between the upper fixing part and the lower fixing part is denoted by H, a dimension of the upper fixing part and the lower fixing part in a longitudinal direction is denoted by D, and a dimension of the upper inclined part and the lower inclined part in the longitudinal direction is denoted by L.

3. The steel damper for seismic isolation according to claim 1, wherein four upper splice plates are arranged to straddle adjacent upper fixing parts of the four seismic isolation plates, and end parts of the upper fixing parts are sandwiched between the upper board and the upper splice plates, and four lower splice plates are arranged to straddle adjacent lower fixing parts of the four seismic isolation plates, and end parts of the lower fixing parts are sandwiched between the lower board and the lower splice plates.

4. The steel damper for seismic isolation according to claim 1, wherein the upper inclined part connects the upper fixing part and an upper part of the connecting part to each other while linearly extending at a predetermined inclination angle, and the lower inclined part connects the lower fixing part and a lower part of the connecting part to each other while linearly extending at the same inclination angle as an inclination angle of the upper inclined part.

5. The steel damper for seismic isolation according to claim 2, wherein the upper inclined part connects the upper fixing part and an upper part of the connecting part to each other while linearly extending at a predetermined inclination angle, and the lower inclined part connects the lower fixing part and a lower part of the connecting part to each other while linearly extending at the same inclination angle as an inclination angle of the upper inclined part.

6. The steel damper for seismic isolation according to claim 4, wherein when the inclination angle is denoted by 0, 5.2°≤0≤15.3° is set.

7. The steel damper for seismic isolation according to claim 1, wherein an upper jig set to a predetermined height is fixed between the lower part of the structure and the upper board, and a lower jig set to a predetermined height is fixed between the foundation and the lower board.

8. The steel damper for seismic isolation according to claim 1, wherein a stud bolt is integrally formed on the upper board, and the upper board is fixed to the structure in a state where the stud bolt is embedded inside the structure made of reinforced concrete, and a stud bolt is integrally formed on the lower board, and the lower board is fixed to the foundation in a state where the stud bolt is embedded inside the foundation made of reinforced concrete.

9. A seismic isolation structure comprising:

the steel damper for seismic isolation according to claim 1; and a seismic isolation device installed between a lower part of a structure and a foundation, and moving in a horizontal direction while supporting a vertical load of the structure when a seismic motion occurs.

10. A steel damper for seismic isolation installed between a lower part of a structure and a foundation, comprising:

an upper board fixed to the lower part of the structure;

a lower board fixed to the foundation to be at the same position in a plan view with respect to the upper board; and two sets of seismic isolation plates fixed to the upper board and the lower board and extending in a cross direction in a plan view, wherein the two sets of seismic isolation plates have an upper split steel sheet and a lower split steel sheet that are split into upper and lower parts, the upper split steel sheet has an upper fixing part provided at a center part in a longitudinal direction, a pair of upper inclined parts bent diagonally downward from both ends of the upper fixing part in the longitudinal direction, and an upper connecting part bent downward from end parts of the pair of upper inclined parts, the lower split steel sheet has a lower fixing part provided at a center part in the longitudinal direction, a pair of lower inclined parts bent diagonally upward from both ends of the lower fixing part in the longitudinal direction, and a lower connecting part bent upward from end parts of the pair of lower inclined parts, the seismic isolation plate is formed by connecting the upper connecting part of the upper split steel sheet and the lower connecting part of the lower split steel sheet, and in the two sets of seismic isolation plates, the upper fixing part and the lower fixing part are orthogonally arranged and overlapped with each other, the upper fixing part is fixed to the upper board, and the lower fixing part is fixed to the lower board.

11. The steel damper for seismic isolation according to claim 10, wherein an upper jig set to a predetermined height is fixed between the lower part of the structure and the upper board, and a lower jig set to a predetermined height is fixed between the foundation and the lower board.

12. The steel damper for seismic isolation according to claim 10, wherein a stud bolt is integrally formed on the upper board, and the upper board is fixed to the structure in a state where the stud bolt is embedded inside the structure made of reinforced concrete, and a stud bolt is integrally formed on the lower board, and the lower board is fixed to the foundation in a state where the stud bolt is embedded inside the foundation made of reinforced concrete.

13. The steel damper for seismic isolation according to claim 10, wherein
a dimension of the upper inclined part and the lower inclined part in a width direction gradually decreases while being separated from the upper fixing part and the lower fixing part.

14. A seismic isolation structure comprising:
the steel damper for seismic isolation according to claim 10; and
a seismic isolation device installed between a lower part of a structure and a foundation, and moving in a horizontal direction while supporting a vertical load of the structure when a seismic motion occurs.

\* \* \* \* \*